United States Patent
Ohmura et al.

(10) Patent No.: US 7,929,019 B2
(45) Date of Patent: Apr. 19, 2011

(54) ELECTRONIC HANDHELD CAMERA WITH PRINT MODE MENU FOR SETTING PRINTING MODES TO PRINT TO PAPER

(75) Inventors: Akira Ohmura, Kawasaki (JP); Shoei Nakamura, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/801,430

(22) Filed: Jun. 8, 2010

(65) Prior Publication Data

US 2010/0271493 A1  Oct. 28, 2010

Related U.S. Application Data

(63) Continuation of application No. 10/815,835, filed on Apr. 2, 2004, now abandoned, which is a continuation of application No. 10/083,144, filed on Feb. 27, 2002, now abandoned, which is a continuation of application No. 09/789,596, filed on Feb. 22, 2001, now abandoned, which is a continuation of application No. 09/184,329, filed on Nov. 2, 1998, now abandoned.

(30) Foreign Application Priority Data

Nov. 5, 1997 (JP) ....................... 9-302554

(51) Int. Cl.
H04N 5/225 (2006.01)
H04N 5/77 (2006.01)
(52) U.S. Cl. ..................... 348/207.2; 386/224; 386/362; 358/909.1
(58) Field of Classification Search .................. 386/117, 386/118, 119, 120, 95, 224, 362; 348/207.2; 358/909.1, 906
See application file for complete search history.

(56) References Cited

U.S. PATENT DOCUMENTS

| | | |
|---|---|---|
| 5,087,971 A | 2/1992 | Sakata et al. |
| 5,258,880 A | 11/1993 | Takahashi |
| 5,331,435 A | 7/1994 | Scott |
| 5,477,264 A | 12/1995 | Sarbadhikari et al. |
| 5,587,740 A | 12/1996 | Brennan |
| 5,623,681 A | 4/1997 | Rivette et al. |
| 5,636,315 A | 6/1997 | Sugiyama et al. |
| 5,649,032 A | 7/1997 | Burt et al. |
| 5,786,904 A | 7/1998 | Narita |
| 5,822,499 A | 10/1998 | Okada et al. |
| 5,926,285 A | 7/1999 | Takahashi |
| 6,097,431 A | 8/2000 | Anderson et al. |
| 6,111,605 A | 8/2000 | Suzuki |
| 6,191,815 B1 | 2/2001 | McIntyre |
| 6,380,975 B1 | 4/2002 | Suzuki |
| 6,603,506 B2 | 8/2003 | Ogawa et al. |

FOREIGN PATENT DOCUMENTS

| | | |
|---|---|---|
| EP | 0 652 538 A2 | 10/1995 |
| JP | 06-008537 A | 1/1994 |
| JP | 06-105277 A | 4/1994 |
| JP | 06-253246 A | 9/1994 |
| JP | 08-18840 A | 1/1996 |
| JP | 09-051420 A | 2/1997 |
| JP | 09-139876 A | 5/1997 |

*Primary Examiner* — Vincent Boccio
(74) *Attorney, Agent, or Firm* — Oliff & Berridge, PLC

(57) ABSTRACT

An information processing device converts images to image data and records the image data to a recording medium. The device includes a selector, an arrangement adjuster and an output. The selector selects desired image data to be output to a printing device from among the image data recorded in the recording medium. The arrangement adjuster adjusts an arrangement of the image data when there is image data of more than one image selected by the selector. The output outputs the plurality of image data arranged by the arrangement adjuster to the printing device. The plurality of image data can be, for example, continuously shot image data.

3 Claims, 20 Drawing Sheets

| PAPER SIZE | NUMBER OF FRAMES OF IMAGE | SIZE OF AN IMAGE | PAPER | ARRANGEMENT OF AN IMAGE |
|---|---|---|---|---|
| A4 | 2 | 130mm x 190mm | VERTICAL | TWO ROWS |
| | 3 | 90mm x 190mm | VERTICAL | THREE ROWS |
| | 4 | 90mm x 100mm | VERTICAL | TWO ROWS TWO COLUMNS (TOTAL OF 4 FRAMES) |
| | ⋮ | ⋮ | ⋮ | ⋮ |
| | 9 | 50mm x 60mm | VERTICAL | THREE ROWS THREE COLUMNS (TOTAL OF 9 FRAMES) |

PRINTER 100

| PAPER SIZE | NUMBER OF FRAMES OF IMAGE | SIZE OF AN IMAGE | PAPER | ARRANGEMENT OF AN IMAGE |
|---|---|---|---|---|
| A4 | 2 | 130mm x 190mm | VERTICAL | TWO ROWS |
| | 3 | 90mm x 190mm | VERTICAL | THREE ROWS |
| | 4 | 90mm x 100mm | VERTICAL | TWO ROWS TWO COLUMNS (TOTAL OF 4 FRAMES) |
| | ···· | ···· | ···· | ···· |
| | 9 | 50mm x 60mm | VERTICAL | THREE ROWS THREE COLUMNS (TOTAL OF 9 FRAMES) |

FIG. 17

ELECTRONIC HANDHELD CAMERA WITH PRINT MODE MENU FOR SETTING PRINTING MODES TO PRINT TO PAPER

INCORPORATION BY REFERENCE

The disclosures of the following priority applications are herein incorporated by reference in their entirety. This is a Continuation of application Ser. No. 10/815,835 filed Apr. 2, 2004, which in turn is a Continuation of application Ser. No. 10/083,144 filed Feb. 27, 2002 (now abandoned), which in turn is a Continuation of application Ser. No. 09/789,596 filed Feb. 22, 2001 (now abandoned), which in turn is a Continuation of application Ser. No. 09/184,329 filed Nov. 2, 1998 (now abandoned), which in turn claims priority to Japanese Patent Application No. 9-302554, filed Nov. 5, 1997.

BACKGROUND OF THE INVENTION

1. Field of Invention

This invention relates to an information processing device and method of controlling an information processing device, and to a recording medium. In particular, it relates to an information processing device, method of controlling an information processing device, and a recording medium that converts an optical image of an object to corresponding image data and stores it to a recording medium.

2. Description of Related Art

In a conventional electronic camera, when printing a plurality of shot images using a printer or the like, if these plurality of images are printed on one sheet of recording paper, the images are arranged on the recording paper and are printed according to the number of divisions, such as 4 divisions, 9 divisions, or 16 divisions in the conventional electronic camera.

However, in the conventional electronic camera, there is the problem that an arbitrary number of images cannot be printed to one sheet of recording paper because the number of divisions is predetermined.

SUMMARY OF THE INVENTION

This invention has been made in consideration of the above-mentioned conditions. This invention allows the user to automatically adjust the size of each image, and print according to the number of images to be printed and the size of the recording paper.

The information processing device of this invention includes: a selector that selects desired image data which is output to the printing device from among the image data recorded to the recording medium; an arrangement adjustor that adjusts the arrangement of a plurality of image data when a plurality of image data that has been selected by the selector exists; and an outputting part that outputs the plurality of image data that has been arranged by the arrangement adjustor to a printing device.

BRIEF DESCRIPTION OF THE DRAWINGS

FIG. 17 is one example of a table that is referenced in the processing of FIG. 15;

DETAILED DESCRIPTION OF PREFERRED EMBODIMENTS

Hereafter, embodiments of this invention are explained with reference to the drawings.

Figure 1:
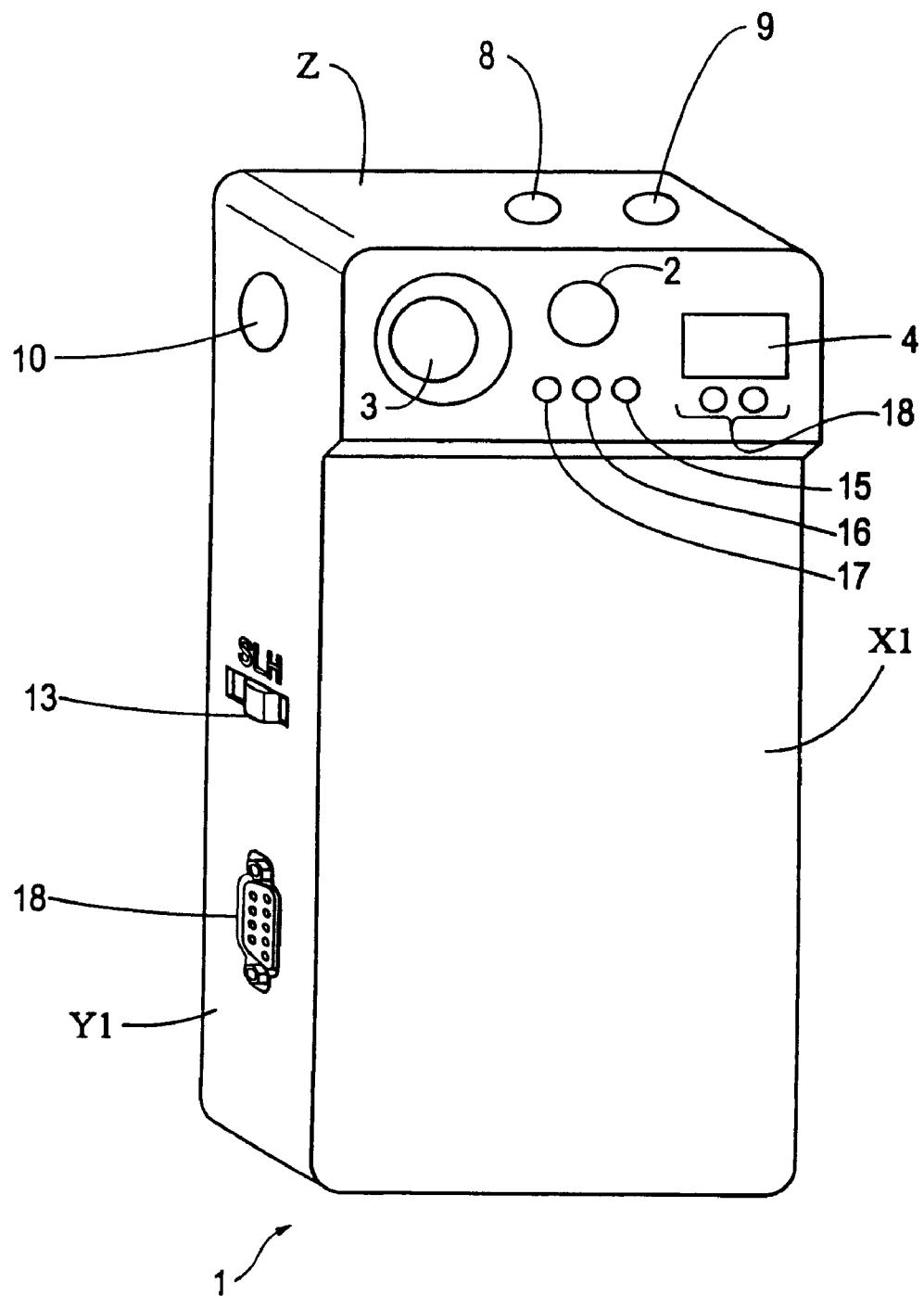
FIG. 1 is a perspective front view of an electronic camera according to an embodiment of this invention.
Figure 2:
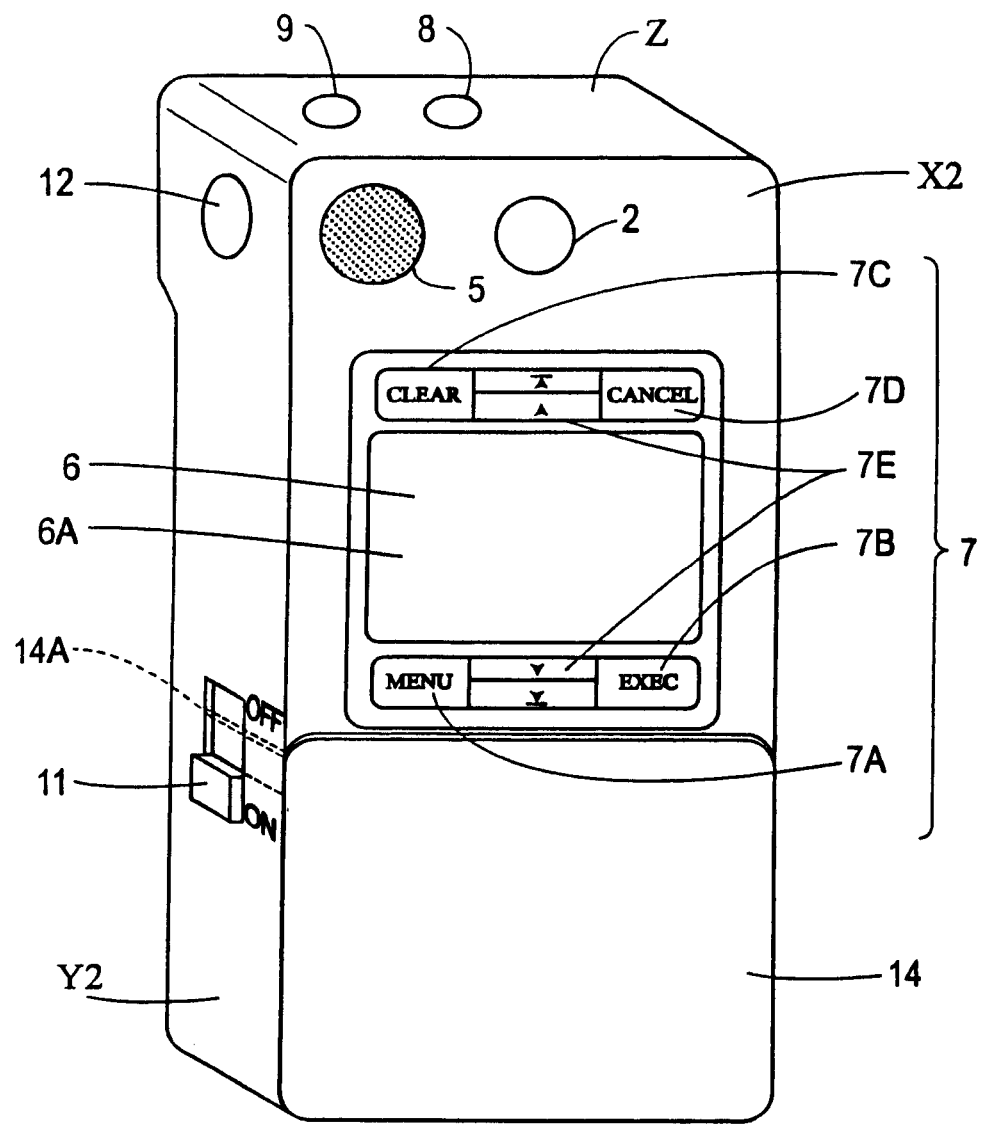
FIG. 2 is a perspective rear view of the FIG. 1 electronic camera.

FIGS. 1 and 2 are perspective views that show a structural example of an embodiment of an electronic camera according to this invention. In the electronic camera of this embodiment, when shooting an object, the surface facing an object is face X1, and the surface facing the user is face X2. On the top part of the face X1 are provided a viewfinder 2 that is used for the confirmation of the shooting range of the object, a shooting lens 3 that takes-in the optical image of the object, and a light emission part (strobe) 4 to irradiate light that illuminates the object.

Additionally, in the face X1 are provided a red-eye reduction lamp 15, a photometry element 16 and a colorimetry element 17. The red-eye reduction lamp 15 reduces the red eye phenomenon by emitting light before the light emission of the strobe 4 when shooting is to be performed with the strobe 4. The photometry element 16 performs photometry while the operation of the CCD 20 (FIG. 4) is stopped. The colorimetry element 17 performs colorimetry while the operation of the CCD 20 is stopped.

On the top part of the face X2, opposed to the face X1 (the position corresponding to the top part of the face X1 in which the viewfinder 2, the shooting lens 3 and the light emission part 4 are formed), the above-mentioned viewfinder 2 and a speaker 5 that outputs sound that is recorded in the electronic camera 1 are provided. Additionally, an LCD 6 and operation keys 7 are formed on the face X2 vertically lower than the viewfinder 2, the shooting lens 3, the light emission part 4 and the speaker 5. On the surface of the LCD 6, a so-called touch tablet 6A is arranged that outputs position data corresponding to a position designated by the touching operation of, e.g., a later-mentioned pen-type designating device.

Touch tablet 6A is made from a transparent material such as glass, resin or the like. Thus, the user can observe, through the touch tablet 6A, an image that is displayed on the LCD 6 formed below the touch tablet 6A.

The operation keys 7 are keys to be operated when reproducing (replaying) and displaying the recorded data on the LCD 6, or the like. They detect the operation (input) by a user and supply it to CPU 39. The menu key 7A, among the operation keys 7, is a key to be operated to display the menu screen on the LCD 6. The execution key 7B is a key to be operated to reproduce the recorded information selected by the user. The clear key 7C is a key to be operated to delete recorded information. The cancel key 7D is a key to be operated to suspend the reproduction processing of the recorded information. The scroll key 7E is a key to be operated to scroll the screen in the vertical direction when the list of the recorded information is displayed on the LCD 6.

Figure 3:
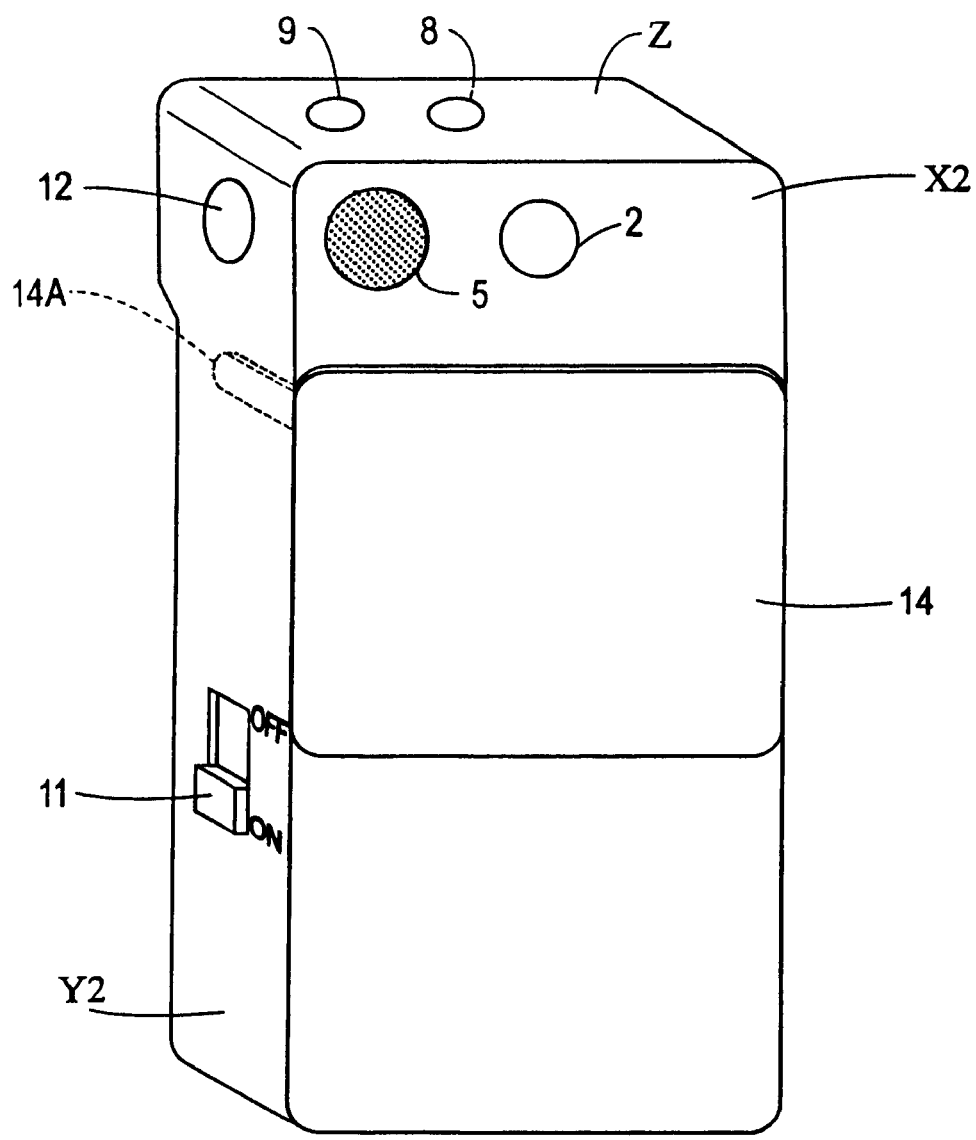
FIG. 3 is a perspective rear view of the FIG. 1 electronic camera in a state where an LCD cover is closed.

On the face X2, a slidable LCD cover 14 is provided that protects the LCD 6 when it is not being used. The LCD cover 14 covers the LCD 6 and the touch tablet 6A when it is shifted to the upper position as shown in FIG. 3. When the LCD cover 14 is shifted to the lower position, the LCD 6 and the touch tablet 6A appear, and a power switch 11 (later-mentioned) that is arranged on the face Y2 is switched to the ON condition by the arm member 14A of the LCD cover 14.

On the face Z, which is the top face of the electronic camera 1, are provided a microphone 8 that collects sound and an earphone jack 9 to which an earphone, not shown in the figure, is connected.

On the left side face Y1 are provided a release switch 10, a continuous shooting mode switch 13 and a printer connecting terminal 18. The release switch 10 is operated when shooting the object. The continuous shooting mode switch 13 is operated when switching to the continuous shooting mode at the time of shooting. The printer connecting terminal 18 is for connecting the electronic camera 1 to an external printer. The release switch 10, continuous shooting mode switch 13 and printer connecting terminal 18 are arranged vertically below the viewfinder 2, the shooting lens 3 and the light emission part 4, provided at the top end of the face X1.

On the face Y2 (the right side face) that opposes the face Y1 are provided a recording switch 12, that is operated when recording sound, and a power switch 11. The recording switch 12 and the power switch 11 are arranged vertically below the viewfinder 2, the shooting lens 3 and the light emission part 4, provided on the top end of the face X1, in a similar manner as the above-mentioned release switch 10 and continuous shooting mode switch 13. Preferably, the recording switch 12 is formed at approximately the same height as the release switch 10 of the face Y1, and it is structured so that the user does not sense a difference, no matter whether he or she holds the camera by the left hand or the right hand.

Alternatively, it is possible to arrange the position of the recording switch 12 so that it is different from the position of the release switch 10 so that when the user presses one of the switches, when the user holds the opposite side face of the camera with a finger in order to cancel the moment induced by this pressure, the user does not accidentally press the switch that is provided on the other side face.

The above-mentioned continuous shooting mode switch 13 is used when setting whether an object is shot for only one frame (single shot) or shot for a plurality of frames (continuous shooting) when the user shoots the object by pressing the release switch 10. For example, when the indicator of the continuous shooting mode switch 13 is moved to the position "S" (in other words, it is switched to the S mode), when the release switch 10 is pressed, shooting is performed for only one frame. When the indicator of the continuous shooting mode switch 13 is moved to the position "L" (in other words, it is switched to the L mode), when the release switch 10 is pressed, shooting of 8 frames per second is performed during the period when the release switch 10 is pressed (in other words, it is placed in a low speed continuous shooting mode). Furthermore, when the indicator of the continuous shooting mode switch 13 is moved to the position "H" (in other words, it is switched to the H mode), when the release switch 10 is pressed, shooting of 30 frames per second is performed during the period when the release switch 10 is pressed (in other words, it is placed in a high speed continuous shooting mode).

Figure 4:
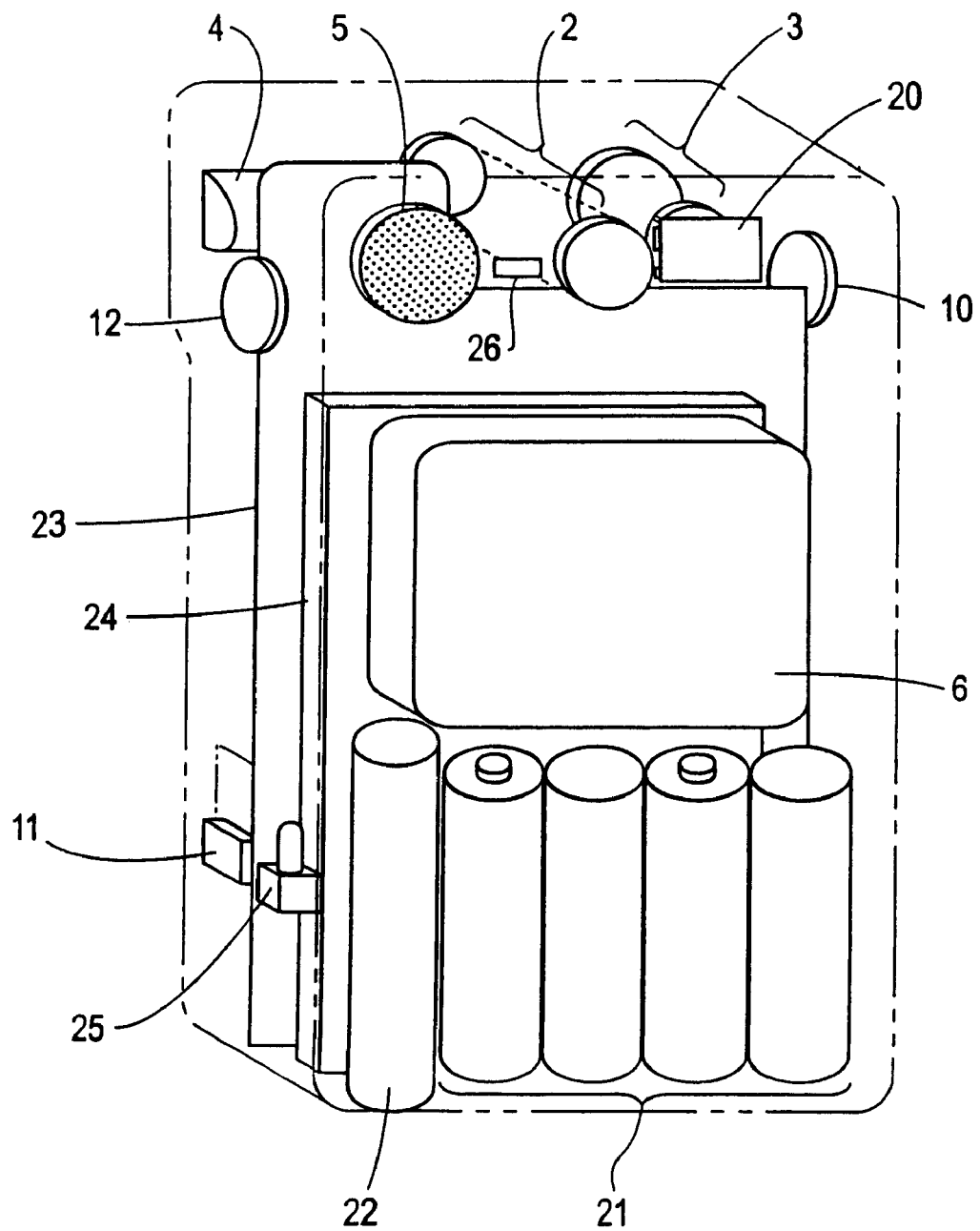
FIG. 4 is a perspective view showing an internal structure of the electronic camera of FIGS. 1-2.

Next, the internal structure of the electronic camera 1 is explained. FIG. 4 shows a structural example of the inside of the electronic camera shown in FIGS. 1 and 2. A CCD 20 is provided at the rear side (face X2 side) of the shooting lens 3. CCD 20 is a photoelectric converter in that it photoelectrically converts the optical image of an object that is image-formed via the shooting lens 3 into an electrical signal.

An in-finder display element 26 is arranged in the field of view of the viewfinder 2, and displays the setting conditions of various kinds of functions to the user viewing an object through the viewfinder 2.

Below the LCD 6, four cylinder-shaped batteries (AAA dry cell batteries) 21 are vertically aligned. The electric power that is stored in the batteries 21 is supplied to each part of the camera. Additionally, below the LCD 6 is arranged a condenser 22 that accumulates a charge in order to cause the light emission part 4 to emit light.

On a circuit board 23, various control circuits are formed that control each part of the electronic camera 1. Additionally, between the circuit board 23 and the LCD 6 and batteries 21, a memory card 24 is detachably provided. Various kinds of information that are input to the electronic camera 1 are recorded respectively in predetermined areas of the memory card 24.

Figure 5:
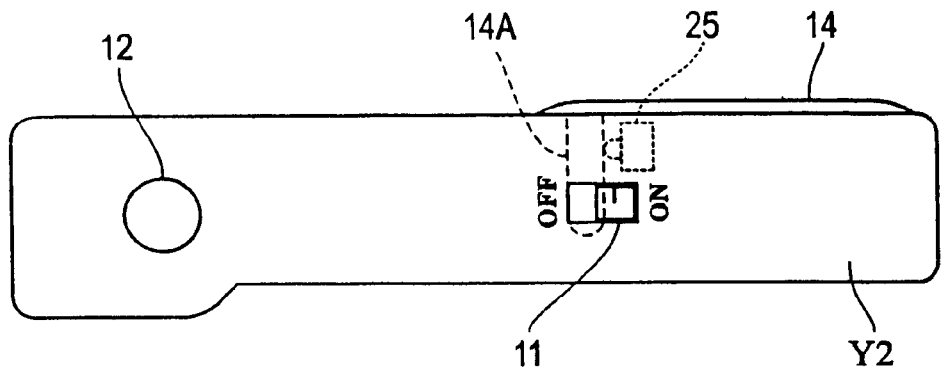
FIGS. 5A-5C are views showing the relationship between the position of the LCD cover 14 and the state of the power switch 11 and the LCD switch 25 in the camera.
Figure 5:
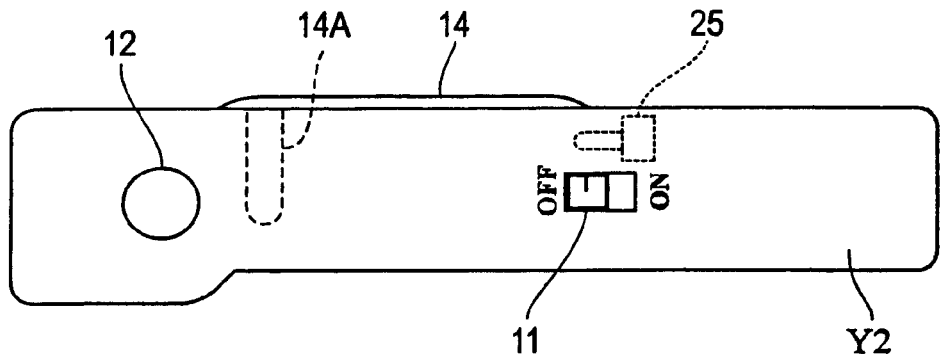
Figure 5:
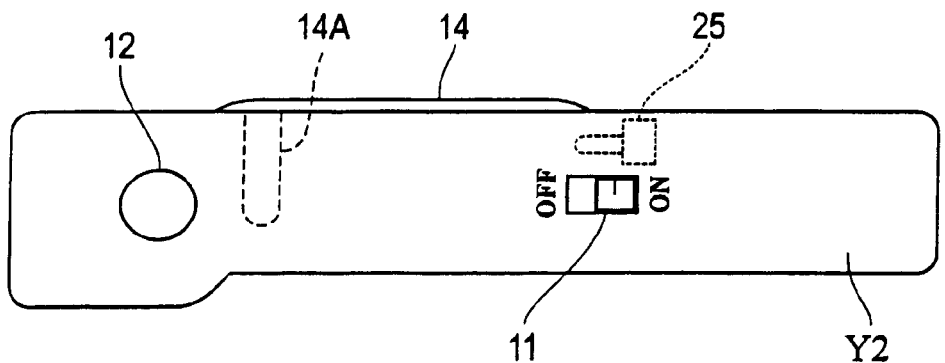

An LCD switch 25 that is arranged adjacent to the power switch 11 is a switch that is placed in the ON condition only while its plunger is pressed. This occurs when the LCD cover 14 is shifted downward, as shown in FIG. 5A. LCD switch 25 is switched to the ON condition along with the power switch 11 by the arm member 14A of the LCD cover 14.

When the LCD cover 14 is positioned in the upper position, the power switch 11 can be operated by the user independent of the LCD switch 25. For example, as shown in FIG. 5B, when the LCD cover 14 is closed and the electronic camera 1 is not being used, the power switch 11 and the LCD switch 25 are in the OFF condition. In this condition, when the user switches the power switch 11 to the ON condition as shown in FIG. 5C, the power switch 11 is placed in the ON condition, however the LCD switch 25 stays in the OFF condition. Meanwhile, when the power switch 11 and the LCD switch 25 are in the OFF condition as shown in FIG. 5B, when the LCD cover 14 is open, as shown in FIG. 5A, the power switch 11 and the LCD switch 25 are placed in the ON condition. Then, after this, when the LCD cover 14 is closed, only the LCD switch 25 is placed in the OFF condition as shown in FIG. 5C.

In this embodiment, the memory card 24 is detachable. However, it is also acceptable to provide a memory on the circuit board 23 and it is possible to record various kinds of information in that memory. Additionally, it is acceptable to output various kinds of information recorded in the memory (memory card 24) to an external personal computer via an interface 48 (not shown).

Figure 6:
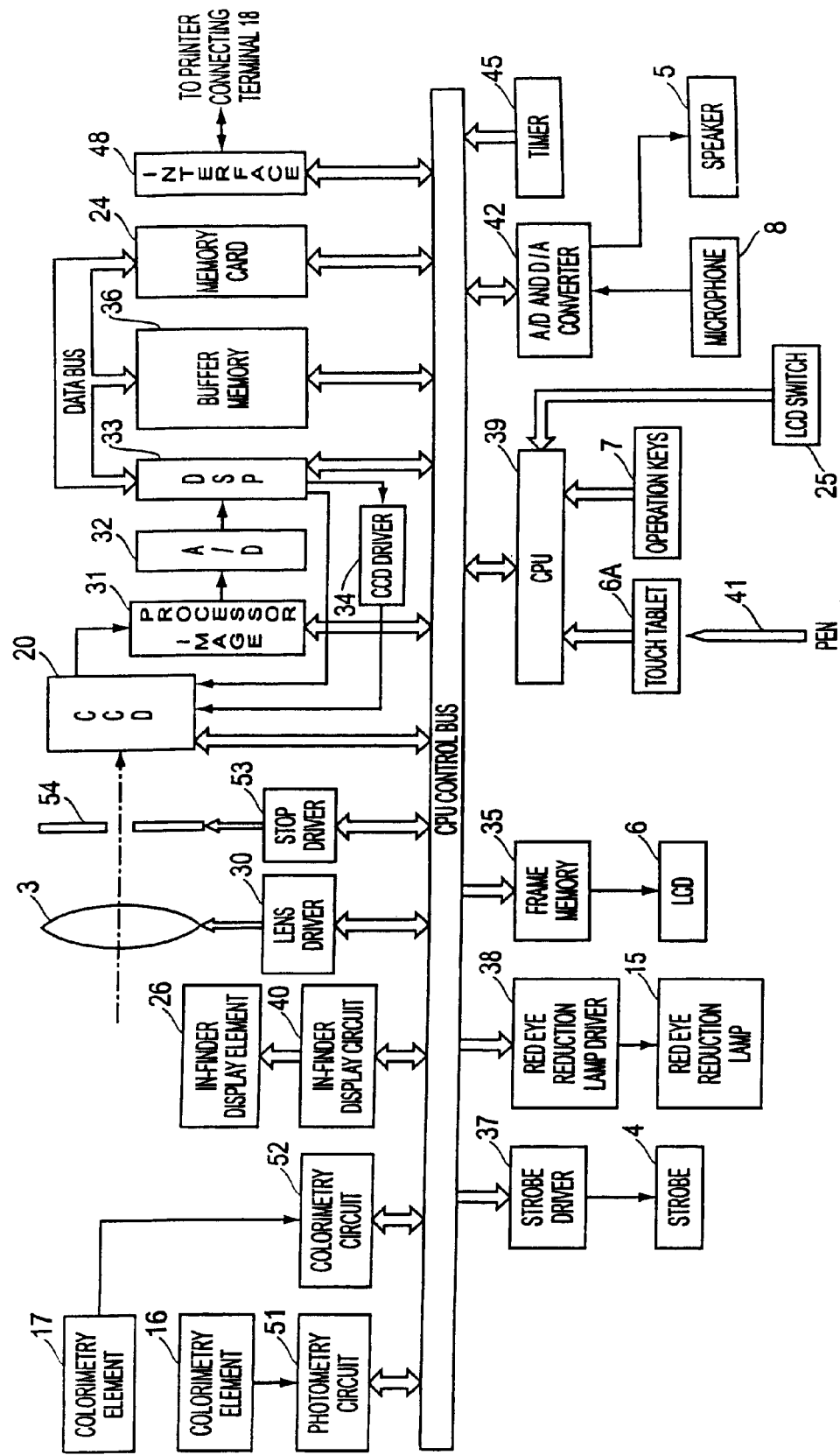
FIG. 6 is a block diagram showing the electrical structure of the internal portion of the electronic camera shown in FIGS. 1-2.

Next, the internal structure of the electronic camera 1 of this embodiment is explained with reference to the block diagram of FIG. 6. The CCD 20, which includes a plurality of pixels, photoelectrically converts an optical image that is image-formed on each pixel into an image signal (electrical signal). The digital signal processor (hereafter DSP) 33 supplies a CCD horizontal driving pulse to the CCD 20, controls the CCD driving circuit (CCD driver) 34, and also supplies a CCD vertical driving pulse to the CCD 20.

An image processor 31 is controlled by the CPU 39, and samples the image signal that is photoelectrically converted by the CCD 20 at a predetermined timing, and amplifies the sampled signal to a specified level. The analog/digital converting circuit (hereafter A/D converter) 32 digitizes the image signal that is sampled at the image processor 31, and supplies it to the DSP 33.

The DSP 33 controls a data bus that is connected to the buffer memory 36 and to the memory card 24. After temporarily storing the image data that is supplied from the A/D converter 32 to the buffer memory 36, the DSP 33 reads out image data stored in the buffer memory 36 and records the image data to the memory card 24. Additionally, the DSP 33 stores the image data that is supplied from the A/D converter 32 in the frame memory 35, displays it on the LCD 6, and reads out the shot image data from the memory card 24. After decompressing the shot image data, the DSP 33 stores the decompressed image data in the frame memory 35 and displays it on the LCD 6.

When the electronic camera 1 is active, the DSP 33 repeatedly operates the CCD 20 while adjusting the exposure time (exposure value) until the exposure level of the CCD 20 reaches an appropriate value. At this time, it is also acceptable for the DSP 33 to operate the photometry circuit 51 at first, and to calculate the initial value of the exposure time of the CCD 20 according to the light receiving level that is detected by the photometry element 16. By doing this, the adjustment of the exposure time of the CCD 20 can be performed in a short period.

In addition to these operations, the DSP 33 performs timing control of data input/output when recording to the memory card 24, when storing decompressed image data in the buffer memory 36, and the like.

The buffer memory 36 is used to accommodate the difference between the speed of data input/output of the memory card 24 and the processing speed of the CPU 39 and the DSP 33.

The microphone 8 inputs sound information (collects sound) and supplies that sound information to the A/D and D/A converter 42. The A/D and D/A converter 42, after converting the analog signal that corresponds to the sound detected by the microphone 8 into a digital signal, outputs the digital signal to the CPU 39. The A/D and D/A converter 42 also analyzes digital sound data that is supplied from the CPU 39 and outputs an analog sound signal to the speaker 5.

The photometry element 16 measures the light amount of the object and its surroundings, and outputs the measurement result to the photometry circuit 51. The photometry circuit 51, after performing a specified processing to the analog signal that is the photometric result supplied from the photometry element 16, converts it into a digital signal and outputs the digital signal to the CPU 39.

The colorimetry element 17 measures the color temperature of the object and its surroundings, and outputs the measurement result to the colorimetry circuit 52. The colorimetry circuit 52, after performing a specified processing to the analog signal that is the colorimetric result supplied from the colorimetry element 17, converts it into a digital signal and outputs the digital signal to the CPU 39.

The timer 45 has a built-in clock circuit, and outputs data that corresponds to the current time to the CPU 39.

A stop driver 53 sets the aperture diameter of the stop 54 to a specified value. The stop 54 is arranged between the shooting lens 3 and the CCD 20, and changes the aperture of the incident light from the shooting lens 3 to the CCD 20.

The CPU 39 stops the operation of the photometry circuit 51 and the colorimetry circuit 52 when the LCD cover 14 is opened in response to the signal from the LCD switch 25, and, when the LCD cover 14 is closed, operates the photometry circuit 51 and the colorimetry circuit 52 and also stops the operation of the CCD 20 (for example, the electronic shutter operation) until the release switch 10 is placed in the half-pressed condition (the condition in which a first operation is performed). The CPU 39 controls the photometry circuit 51 and the colorimetry circuit 52 when the operation of the CCD 20 is stopped, and receives the photometric result of the photometry element 16 and also receives the colorimetric result of the colorimetry element 17. Then, the CPU 39 calculates the white balance adjustment value that corresponds to the color temperature supplied from the colorimetry circuit 52 with reference to a specified table, and supplies the white balance adjustment value to the image processor 31. In other words, when the LCD cover 14 is closed, the LCD 6 is not used as an electronic viewfinder and therefore the operation of the CCD 20 is stopped. The CCD 20 consumes a large amount of electric power. Therefore, electric power of the batteries 21 can be saved by suspending the operation of the CCD 20 as described above.

Additionally, the CPU 39 controls the image processor 31 when the LCD cover 14 is closed so that the image processor 31 does not perform various kinds of processing until the release switch 10 is operated (until the release switch 10 is placed in the half-pressed condition). Additionally, the CPU 39 controls the stop driver 53 when the LCD cover 14 is closed so that the stop driver 53 does not perform the operation of the change in the aperture diameter of the stop 54 or the like until the release switch 10 is operated (until the release switch 10 is placed in the half-pressed condition).

The CPU 39 controls the red-eye reduction lamp driver 38 and makes the red-eye reduction lamp 15 emit the appropriate amount of light before the strobe 4 is emitted. The CPU 39 also controls the strobe driving circuit 37 and makes the strobe 4 emit the appropriate amount of light. Additionally, when the LCD cover 14 is opened (in other words, when the electronic viewfinder is used) the CPU 39 makes the strobe 4 not emit light. By doing this, the object can be shot in the condition of the image displayed in the electronic viewfinder.

The CPU 39 records the shooting date as header information of the image data in the shooting image recording area of the memory card 24 in accordance with the date data supplied from the timer 45. In other words, the data of the shooting date is attached to (associated with) the shot image data recorded in the shooting image recording area of the memory card 24. Additionally, the CPU 39, after compressing the digitized sound information, stores the digitized and compressed sound data temporarily in the buffer memory 36, and then records it in a specified area (sound recording area) of the memory card 24. Additionally, at this time, the data of the recording date is recorded as header information of the sound data in the sound recording area of the memory card 24.

The CPU 39 performs the auto-focus operation by controlling the lens driving circuit (lens driver) 30 and shifting the shooting lens 3. The CPU 39 also controls the stop driver 53 and changes the aperture diameter of the stop 54 arranged between the shooting lens 3 and the CCD 20. Furthermore, the CPU 39 controls the in-finder display circuit 40 and makes the in-finder display element 26 display the settings of the various operations or the like.

The CPU 39 performs sending and receiving of specified data to/from a specified external device (not shown) via the interface (I/F) 48. Additionally, the CPU 39 receives signals from the operation keys 7 and appropriately processes them.

When a specified position of the touch tablet 6A is pressed by a pen (pen-type designating member) 41 that is operated by the user, the CPU 39 reads out the X-Y coordinates of the pressed position of the touch tablet 6A, and accumulates the coordinate data (later-mentioned line drawing information) into the buffer memory 36. Additionally, the CPU 39 records the line drawing information stored in the buffer memory 36 into the line drawing information memory of the memory card 24 along with header information of the line drawing information input date.

Next, various operations of the electronic camera 1 of this embodiment are explained. First, the electronic viewfinder operation of the LCD 6 of this device is explained. When the user half-presses the release switch 10, the DSP 33 determines whether the LCD cover 14 is opened from the value of the signal that corresponds to the condition of the LCD switch 25 supplied from the CPU 39. When it determines that the LCD cover 14 is closed, DSP 33 does not perform the electronic viewfinder operation. In this case, the DSP 33 suspends processing until the release switch 10 is operated.

Additionally, when the LCD cover 14 is closed, since the electronic viewfinder operation is not performed, the CPU 39 suspends operation of the CCD 20, the image processor 31 and the stop driver 53. Then, the CPU 39 operates the photometry circuit 51 and the colorimetry circuit 52 instead of operating the CCD 20, and supplies these measurement results to the image processor 31. The image processor 31 uses the values of these measurement results when performing the white balance control and control of the luminance value. When the release switch 10 is operated, the CPU 39 performs the operation of the CCD 20 and the stop driver 53.

On the other hand, when the LCD cover 14 is opened, the CCD 20 performs the electronic shutter operation at a specified exposure amount per specified time period, photoelectrically converts the optical image of the object that is light collected by the shooting lens 3, and outputs the image signal obtained by the operation to the image processor 31. The image processor 31 performs the white balance control and control of the luminance value, and after performing a specified processing to the image signal, outputs the image signal to the A/D converter 32. Additionally, when the CCD 20 is operated, the image processor 31 uses an adjustment value that is used for the white balance control and the luminance value control calculated by the CPU 39 using the output of the CCD 20. Then, the A/D converter 32 converts the image signal (an analog signal) into image data (a digital signal), and outputs the image data to the DSP 33. The DSP 33 outputs the image data to the frame memory 35, and displays the image that corresponds to the image data on the LCD 6.

Thus, when the LCD cover 14 is opened, the CCD 20 performs the electronic shutter operation at a specified time interval, converts the signal output from the CCD 20 each time into image data, outputs the image data to the frame memory 35, and displays the image of the object constantly on the LCD 6. The electronic viewfinder operation is thus performed in the electronic camera 1. Additionally, as described above, when the LCD cover 14 is closed, the electronic viewfinder operation is not performed, the operation of the CCD 20, the image processor 31 and the stop driver 53 are suspended, and the consumption of electric power is saved.

Next, the shooting of an object by this device is explained. First, the case is explained in which the continuous shooting mode switch 13 provided on the face Y1 is switched to the S mode (the mode that performs shooting for only one frame). First, the power of the electronic camera 1 is turned on by switching the power switch 11 shown in FIG. 1 to the side at which ON is printed. The object is confirmed by the user in the viewfinder 2, the release switch 10 provided on the face Y1 is pressed, and the shooting processing of the object is started.

Additionally, when the LCD cover 14 is closed, the CPU 39 restarts the operation of the CCD 20, the image processor 31 and the stop driver 53 when the release switch 10 is placed in the half-pressed condition, and starts the shooting processing of the object when the release switch 10 is placed in the full-pressed condition (the condition in which a second operation is performed).

The optical image of the object observed by the viewfinder 2 is light collected by the shooting lens 3, and is image-formed on the CCD 20, which includes a plurality of pixels. The optical image of the object that is image-formed on the CCD 20 is photoelectrically converted into an image signal at each pixel, and sampled by the image processor 31. The image signal sampled by the image processor 31 is supplied to the A/D converter 32, digitized and output to the DSP 33.

The DSP 33, after temporarily outputting the image data to the buffer memory 36, reads out the image data from the buffer memory 36, compresses it in accordance with, e.g., the JPEG (Joint Photographic Experts Group) method, which is a combination of discrete cosine transformation, quantization and Huffman encoding, and records it in the shot image recording area of the memory card 24. At this time, in the shot image recording area of the memory card 24, the data of the shooting date also is recorded as header information of the shot image data.

Additionally, when the continuous shooting mode switch 13 is switched to the S mode, shooting of only one frame is performed, and even if the release switch 10 is continuously pressed (i.e., held down continuously), no shooting is performed after one frame. When the release switch 10 is continuously pressed, the shot image is displayed on the LCD 6 when the LCD cover 14 is open. Next, the case will be described in which the continuous shooting mode switch 13 is switched to the L mode (the mode that performs continuous shooting of 8 frames per second). When the power switch 11 is switched to the side on which is printed ON and the release switch 10 provided on the face Y1 is pressed, the shooting processing of the object is started. Additionally, when the LCD cover 14 is closed, the CPU 39 restarts the operation of the CCD 20, the image processor 31 and the stop driver 53 when the release switch 10 is placed in the half-pressed condition, and the shooting processing of the object is started when the release switch 10 is placed in the full-pressed condition.

The optical image of the object observed by the user in the viewfinder 2 is light collected by the shooting lens 3, and image-formed on the CCD 20, which comprises a plurality of pixels. The optical image of the object that is image-formed on the CCD 20 is photoelectrically converted into an image signal at each pixel of the CCD 20, and sampled at a rate of 8 times per second by the image processor 31. Additionally, at this time, the image processor 31 thins out ¾ of the pixels among the image electrical signals of all the pixels of the CCD 20.

Figure 7:
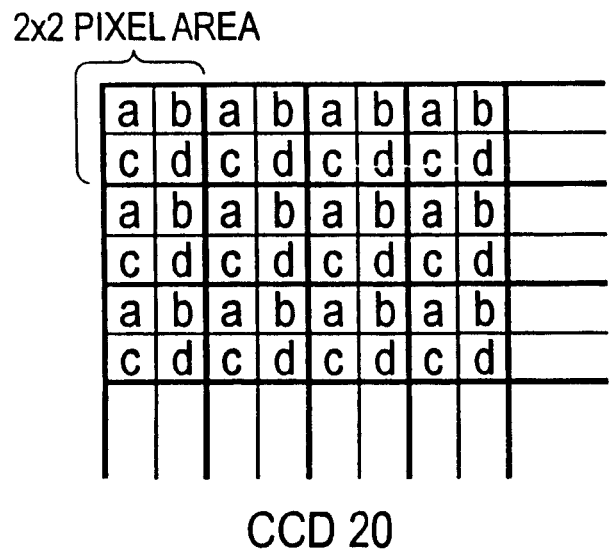
FIG. 7 is a diagram explaining a thinning processing of the pixels during the L mode.

In other words, as shown in FIG. 7, the image processor 31 divides the pixels of the CCD 20 that are arranged in a matrix shape into areas each having 2×2 pixels (4 pixels), samples the image signal of one pixel arranged in a specified position from each area, and thins out the remaining three pixels. For example, at the first sampling cycle (first frame), the pixel "a" at the top left corner of each area is sampled, and the other pixels "b", "c" and "d" are thinned out. At the second sampling cycle (second frame), the pixel "b" at the top right corner of each area is sampled, and the other pixels "a", "c" and "d" are thinned out. Thereafter, at the third, fourth, and following sampling cycles, the pixel "c" at the bottom left and the pixel "d" at the bottom right are sampled, respectively, and the other pixels are thinned out. In other words, each pixel is sampled once for every four frames.

The image signals sampled by the image processor 31 (the image signals of ¼ of all the pixels of the CCD 20) are supplied to the A/D converter 32, digitized and output to the DSP 33. The DSP 33 reads out the image signals after temporarily outputting the digitized image signal to the buffer memory 36, and after compressing it in accordance with the JPEG method, for example, records the shot image data that is digitized and compressed to the shot image recording area of the memory card 24. At this time, in the shot image recording area of the memory card 24, the data of the shooting date also is recorded as header information of the shot image data.

The case is now described in which the continuous shooting mode switch 13 is switched to the H mode (a mode that performs continuous shooting of 30 frames per second). When the power of the electronic camera 1 is turned on by switching the power switch 11 to the side printed ON and the release switch 10 provided in the face Y1 is pressed, the shooting processing of the object is started.

Additionally, when the LCD cover 14 is closed, the CPU 39 restarts the operation of the CCD 20, the image processor 31 and stop driver 53 when the release switch 10 is placed in the half-pressed condition, and the shooting processing of the object is started when the release switch 10 is placed in the full-pressed condition.

The optical image of the object observed by the user in the viewfinder 2 is light collected by the shooting lens 3 and image-formed on the CCD 20. The optical image of the object that is image-formed on the CCD 20 is photoelectrically converted into an image signal at each pixel of the CCD 20, and is sampled at the rate of 30 times per second by the image processor 31. Additionally, at this time, the image processor 31 thins out 8/9 of pixels among the image electrical signal of all the pixels of the CCD 20.

Figure 8:
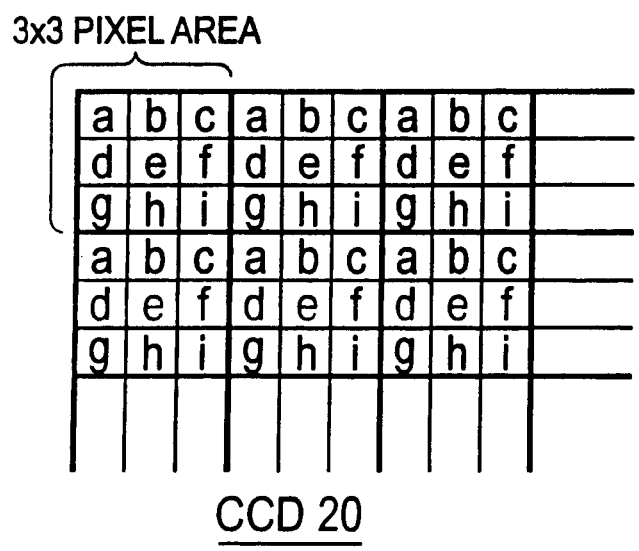
FIG. 8 is a diagram explaining a thinning processing of the pixels during the H mode.

In other words, the image processor 31, as shown in FIG. 8, divides the pixels of the CCD 20, that are arranged in a matrix shape, into areas each having 3×3 pixels (9 pixels), and the image electrical signal of one pixel arranged in a specified position in each area is sampled at a rate of 30 times per second, and the remaining 8 pixels are thinned out.

For example, in the first sampling cycle (first frame), pixel "a" at the left top of each area is sampled, and the other pixels "b" through "i" are thinned out. At the second sampling cycle (second frame), the pixel "b" arranged to the right of the pixel "a" is sampled and the other pixels "a" and "c" through "i" are thinned out. Thereafter, at the third and following sampling cycles, pixel "c", pixel "d" . . . are sampled, respectively, and the other pixels are thinned out. In other words, each pixel is sampled once every 9 frames.

The image signals that are sampled by the image processor 31 (the image signals of ⅑ of all the pixels of the CCD 20) are supplied to the A/D converter 32, and there digitized and output to the DSP 33. The DSP 33 reads out the image signal after temporarily outputting the digitized image signal to the buffer memory 36, and after the image signal is compressed in accordance with the JPEG method, the shot image data that is digitized and compressed is recorded in the shot image recording area of the memory card 24 with header information of the shooting date attached.

Additionally, depending on the necessity, it is possible to operate the strobe 4 and irradiate light onto the object. However, when the LCD cover 14 is open, in other words, when the LCD 6 is performing the electronic viewfinder operation, the CPU 39 preferably controls the strobe 4 to not emit light.

Next, the operation is described in which two-dimensional information (pen input information) is input by the touch tablet 6A. When the touch tablet 6A is pressed with tip of the pen 41, the X-Y coordinates of the point where the pen contacted is input to the CPU 39. These X-Y coordinates are stored in the buffer memory 36. Additionally, it is possible to write the data corresponding to each point of the above-mentioned X-Y coordinates in the frame memory 35, to display line drawings that correspond to the contact of the pen 41 on the above-mentioned X-Y coordinates on the LCD 6.

As described above, since the touch tablet 6A is a transparent member, the user can observe the point displayed on the LCD 6 (the point of the position pressed by the tip of the pen 41), and can feel as if he or she were performing a direct pen input on the LCD 6. Additionally, when the pen 41 is shifted on the touch tablet 6A, a line is displayed on the LCD 6 in accordance with the movement of the pen 41. Furthermore, when the pen 41 is intermittently shifted on the touch tablet 6A, a broken line that follows the movement of the pen 41 is displayed on the LCD 6. As described above, the user inputs line drawing information of desired characters, drawings or the like on the touch tablet 6A (LCD 6).

Additionally, when a shot image is displayed on the LCD 6, when line drawing information is input by the pen 41, this line drawing information is combined with the shot image information in the frame memory 35 and simultaneously displayed on the LCD 6.

Additionally, the user can select the color of the line drawing displayed on the LCD 6 from among black, white, red, blue or the like by operating a color selection switch, not shown in the figures.

After inputting line drawing information to the touch tablet 6A by the pen 41, when the execution key 7B of the operation keys 7 is pressed, the line drawing information that is accumulated in the buffer memory 36 is supplied to the memory card 24 along with header information of the input date, and is recorded in the line drawing information recording area of the memory card 24.

Additionally, the line drawing information recorded in the memory card 24 is information to which compression processing has been performed. Since the line drawing information input by the touch tablet 6A contains much information having a high spatial frequency component, if the compression processing is performed by the JPEG method, used for compression of the above-mentioned shot image, the compression efficiency is poor, the information amount is not reduced, and the time that is necessary for the compression and decompression becomes long. Additionally, compression by the JPEG method is non-reversible (lossy) compression, and therefore is not suitable for the compression of line drawing information, which has a small information amount (because gathering and smearing are emphasized in accordance with the lack of information when it is decompressed and displayed on the LCD 6).

Therefore, in this embodiment, the line drawing information preferably is compressed by the run-length method, which is used for fax machines or the like. The run-length method is a method used to compress line drawing information by scanning the line drawing screen in a horizontal direction and encoding the length over which the information (dots) of each color of black, white, red, blue or the like continues, and the length over which non-information (the portions at which there is no pen input) continues. By using this run-length method, the line drawing information can be compressed to a minimum amount. Additionally, even when the compressed line drawing information is decompressed, information deficiencies can be suppressed. Additionally, it is also possible to not compress the line drawing information when its information amount is relatively small.

Furthermore, as described above, when the shot image is displayed on the LCD 6, if pen input is performed, the shot image data and the line drawing information of the pen input are combined in the frame memory 35 and the combined image of the shot image and line drawing is displayed on the LCD 6. Meanwhile, in the memory card 24, the shot image data is recorded in the shot image recording area, and the line drawing information is recorded in the line drawing information recording area. Because two pieces of information are thus recorded in their respective areas, the user can delete either of the images (e.g., the line drawing) from the combined image of the shot image and the line drawing, and can also compress the respective image information by individual (different) compression methods.

Figure 9:
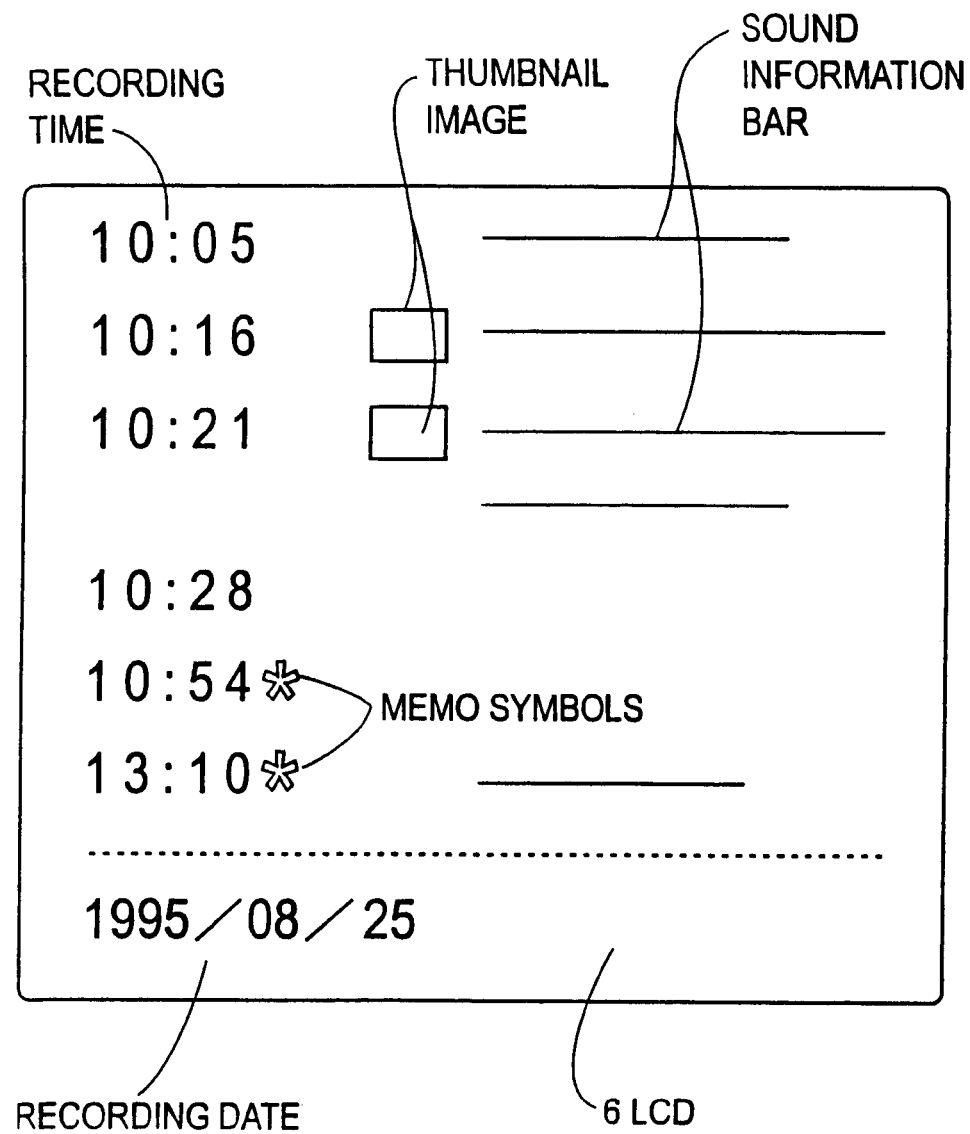
FIG. 9 shows an example of the display screen of the electronic camera shown in FIGS. 1-2.

When data is recorded in the sound recording area, the shot image recording area, or the line drawing information recording area of the memory card 24, as shown in FIG. 9, a specified message is displayed on the LCD 6. On the display screen of the LCD 6 shown in FIG. 9, the recording date on which the information is recorded (recording date) is displayed at the base of the screen (in this case, Aug. 25, 1995). The recording times of the information recorded on the recording date are displayed at the far left on the screen.

To the right of the recording times, thumbnail images are displayed when there is shot image information. The thumbnail images are created by thinning out (reducing) the bit map data of each image data of the shot image data recorded on the memory card 24. An entry with this kind of display is an entry including shot image information. That is, the information recorded (input) at "10:16" and "10:21" contains shot image information, and the information recorded at "10:05", "10:28", "10:54" and "13:10" does not contain shot image information. Furthermore, the memo symbol "*" indicates that a specified memo is recorded as line drawing information. To the right of the thumbnail image display area, a sound information bar is displayed. The length of the bar (line) corresponds to the length of the recording time (when no sound information is input, no line is displayed).

The user presses any part of the display line of the desired information on the LCD 6 shown in FIG. 9 with the tip of the pen 41 to designate the information to be reproduced. By pressing the execution key 7B shown in FIG. 2 with the tip of the pen 41, the designated information is selected and then reproduced. For example, when the line on which "10:05" shown in FIG. 9 is displayed is pressed by the pen 41 (and then the key 7B is pressed), CPU 39 reads the sound data corresponding to the selected recording time and date (10:05) from the memory card 24. After the sound data is decompressed, it is supplied to the A/D and D/A converter 42. After the supplied sound data is converted to analog data in the A/D and D/A converter 42, the data is reproduced through the speaker 5.

When the shot image data that has been recorded in the memory card 24 is to be reproduced, the user can designate the information by pressing the desired thumbnail image with the tip of the pen 41 and pressing the execution key 7B to select the designated information to be reproduced. CPU 39 instructs DSP 33 to read out the shot image data corresponding to the selected shooting time and date from the memory card 24. DSP 33 decompresses the shot image data (compressed shot image data) read from the memory card 24, stores this shot image data in the frame memory 35 as bit map data, and displays it on the LCD 6.

An image that has been shot in the S mode is displayed as a still image on the LCD 6. Needless to say, this still image is an image in which the image signals of all the pixels of the CCD 20 are reproduced. An image that was shot in the L mode is continually displayed (e.g., as a moving picture) at the rate of 8 frames per second on the LCD 6. At this time, the number of pixels that are displayed in each frame is ¼ of the number of all the pixels of the CCD 20. Usually, human eyes sensitively respond to the deterioration of the resolution of the still image, so the user will perceive the image as being deteriorated in image quality if the pixels of the still image are thinned out. However, when the continuous shooting speed is increased by shooting 8 frames per second in the L mode, and the image is reproduced at the rate of 8 frames per second, the number of pixels per frame becomes ¼ of the number of pixels of the CCD 20. However, because human eyes observe 8 frames of images per second, the amount of information that enters the human eyes per second becomes double compared to the case of the still image.

That is, when the number of pixels of one frame of the image that has been shot in the S mode is 1, the number of pixels of one frame of the image that has been shot in the L mode is ¼. When the image (still image) that has been shot in the S mode is displayed on the LCD 6, the information amount that enters the human eyes per second is 1(=(number of pixels 1)×(number of frames 1)). Meanwhile, when the image that has been shot by the L mode is displayed on the LCD 6, the information amount that enters the human eyes per second is 2(=(number of pixels ¼)×(number of frames 8)). That is, double the amount of information of the still image enters the human eyes. Therefore, even if the number of pixels in one frame is ¼, the user can observe the reproduced image without noticing deterioration of the image quality during the reproduction.

Furthermore, in this embodiment, because the pixels that vary depending upon each frame are sampled and the sampled pixels are displayed on the LCD 6, the residual image effect occurs in the human eyes. Even if ¾ of the pixels per frame are thinned out, the user can observe the image that has been shot in the L mode displayed on the LCD 6 without noticing deterioration of the image quality.

Additionally, an image that has been shot in the H mode is continually displayed at the rate of 30 frames per second on the LCD 6. At this time, the number of pixels that are displayed per frame is ⅛ of the number of the pixels of the CCD 20, but the user can observe the image that has been shot by the H mode displayed on the LCD 6 without noticing deterioration of the image quality because of the same reason as for the L mode.

In this embodiment, when objects are shot in the L mode and the H mode, the image processor 31 thins out pixels of the CCD 20 to a degree where the user does not notice deterioration of the image quality during the reproduction, so the load of the DSP 33 can be decreased and the DSP 33 can be operated at low speed and low power. Furthermore, because of this, low cost and low power consumption of the device are possible.

Figure 10:
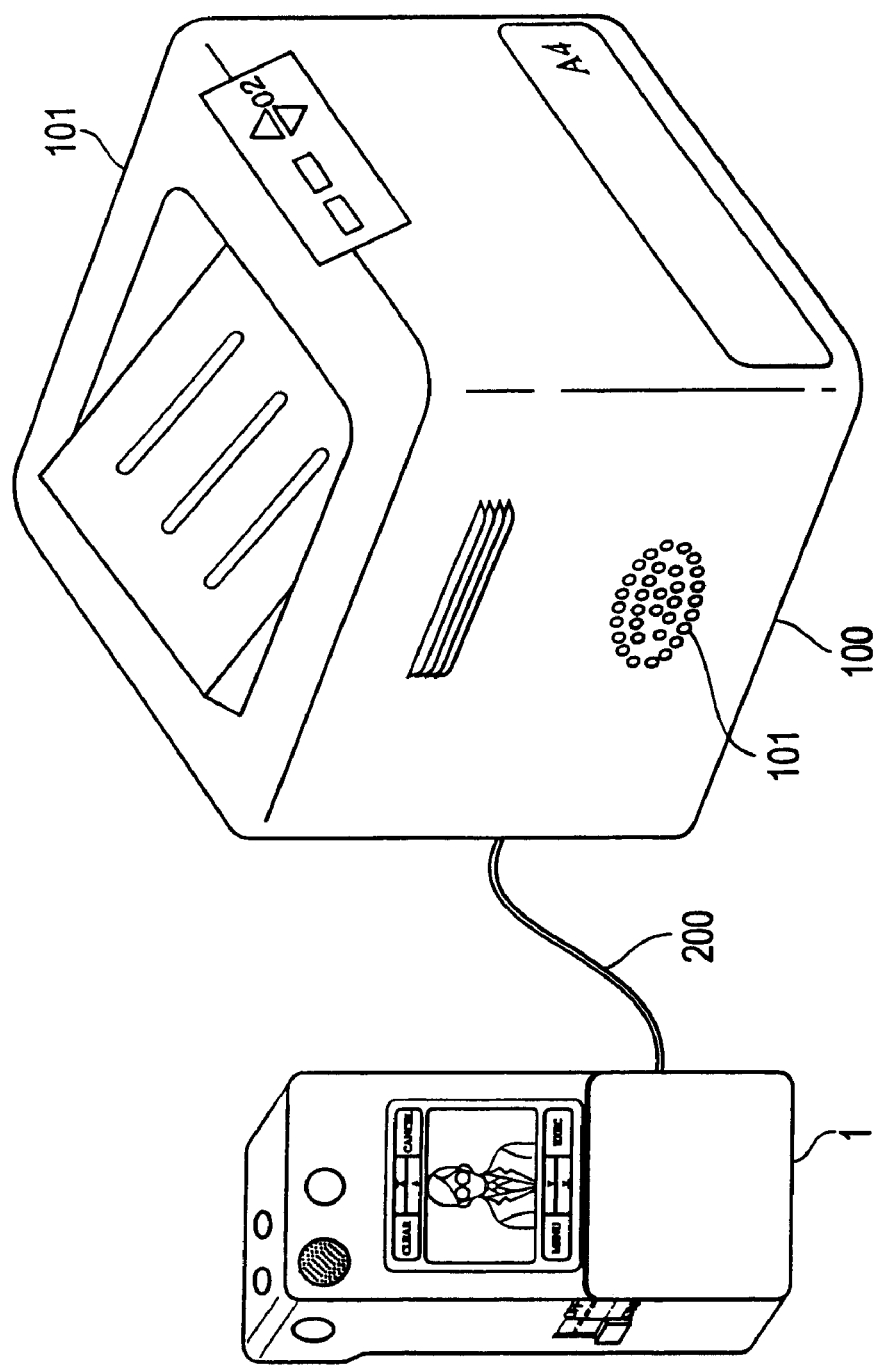
FIG. 10 shows the case when the electronic camera shown in FIG. 1 is connected to a printer 100.

The electronic camera 1 of this embodiment can be connected to the external printer 100 by the cable 200 via the printer connecting terminal 18 as shown in FIG. 10, and the shot image can be printed on recording paper.

Figure 11:
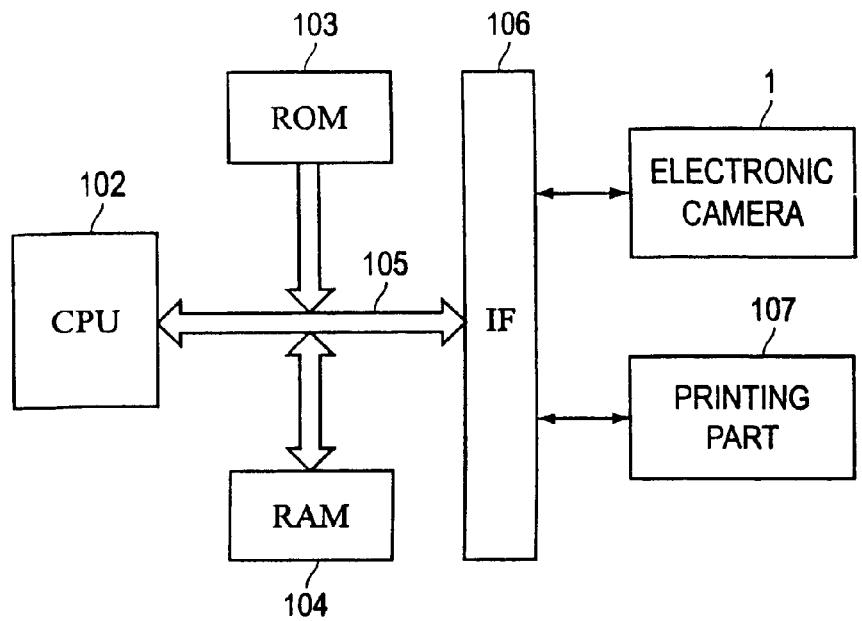
FIG. 11 is a block diagram of a structural example of the printer 100 shown in FIG. 10.

FIG. 11 is a block diagram which shows a structural example of the printer 100 which is shown in FIG. 10. In this figure, CPU 102 performs various kinds of processing in accordance with a program which is stored in ROM 103. RAM 104 stores data and programs or the like during calculations when CPU 102 is performing specified processing. IF 106 converts the format of the data as needed when the CPU 102 exchanges data with an external machine. Bus 105 mutually connects the CPU 102, the ROM 103, the RAM 104 and the IF 106, and transfers data between these devices.

An external electronic camera 1 and a printing part 107 are connected to IF 106.

The printing part 107 prints image data, which is transmitted from the electronic camera 1 and to which specified processing is performed by CPU 102, on recording paper.

Next, the setting processing and the printing processing of the printer 100 when the printer 100 is connected to the electronic camera 1 of this embodiment is explained below.

Figure 12:
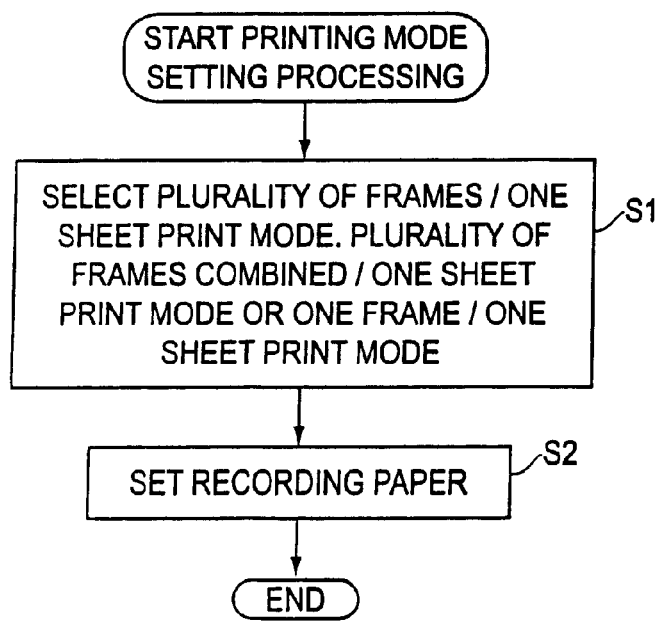
FIG. 12 is a flow chart explaining one example of processing to set a printing mode.

FIG. 12 is a flowchart which explains one example of the setting processing of the printing mode of the printer 100. This processing is executed when the selection item "setting of the printing mode" is selected on a menu screen (not shown in the figure) which is displayed when the menu key 7A is pressed.

Figure 13:
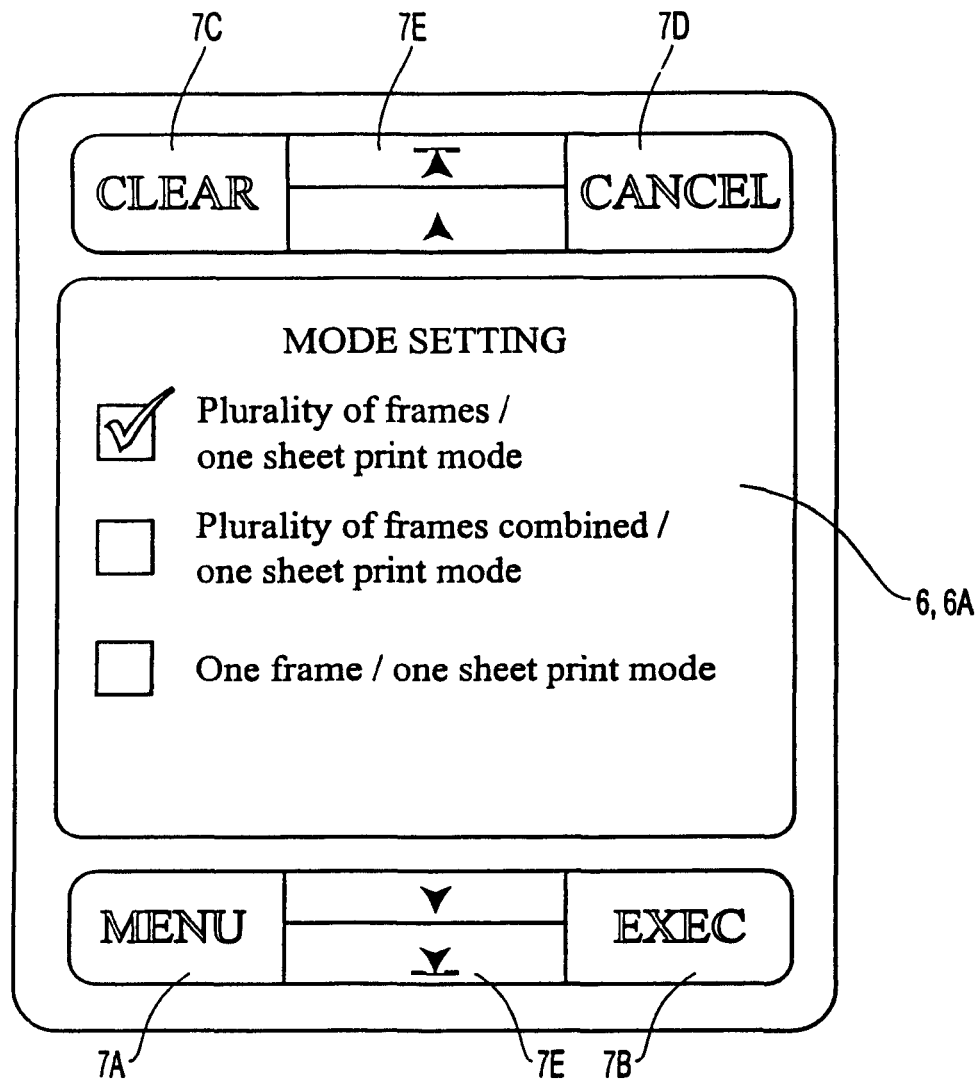
FIG. 13 is a display example of a screen displayed on the LCD 6 when the processing of FIG. 12 is executed.

When this processing is executed, the CPU 39 of the electronic camera 1 displays the setting screen which is shown in FIG. 13 on the LCD 6 in step S1. Then, it receives the input of the printing mode.

A title "mode setting" is displayed at the top of the screen in the display example which is shown in FIG. 13. Underneath the title, the selection items "plurality of frames/one sheet print mode", "plurality of frames combined/one sheet print mode" and "one frame/one sheet print mode" are displayed. At the left side of each selection item, a box is displayed that is checked when the item is selected.

The selection item "plurality of frames/one sheet print mode" is to print a plurality of frames (shot images) on one recording paper. The "plurality of frames combined/one sheet print mode" is to superimpose a plurality of frames and record them as one image. The "one frame/one sheet print mode" is to print one image on one respective recording paper.

In step S1, when any one of the aforementioned three selection items is selected (when any one of the three boxes is checked), the CPU 39 stores information which shows the selected mode into a setting of information recording area of the memory card 24, and proceeds to step S2.

Figure 14:
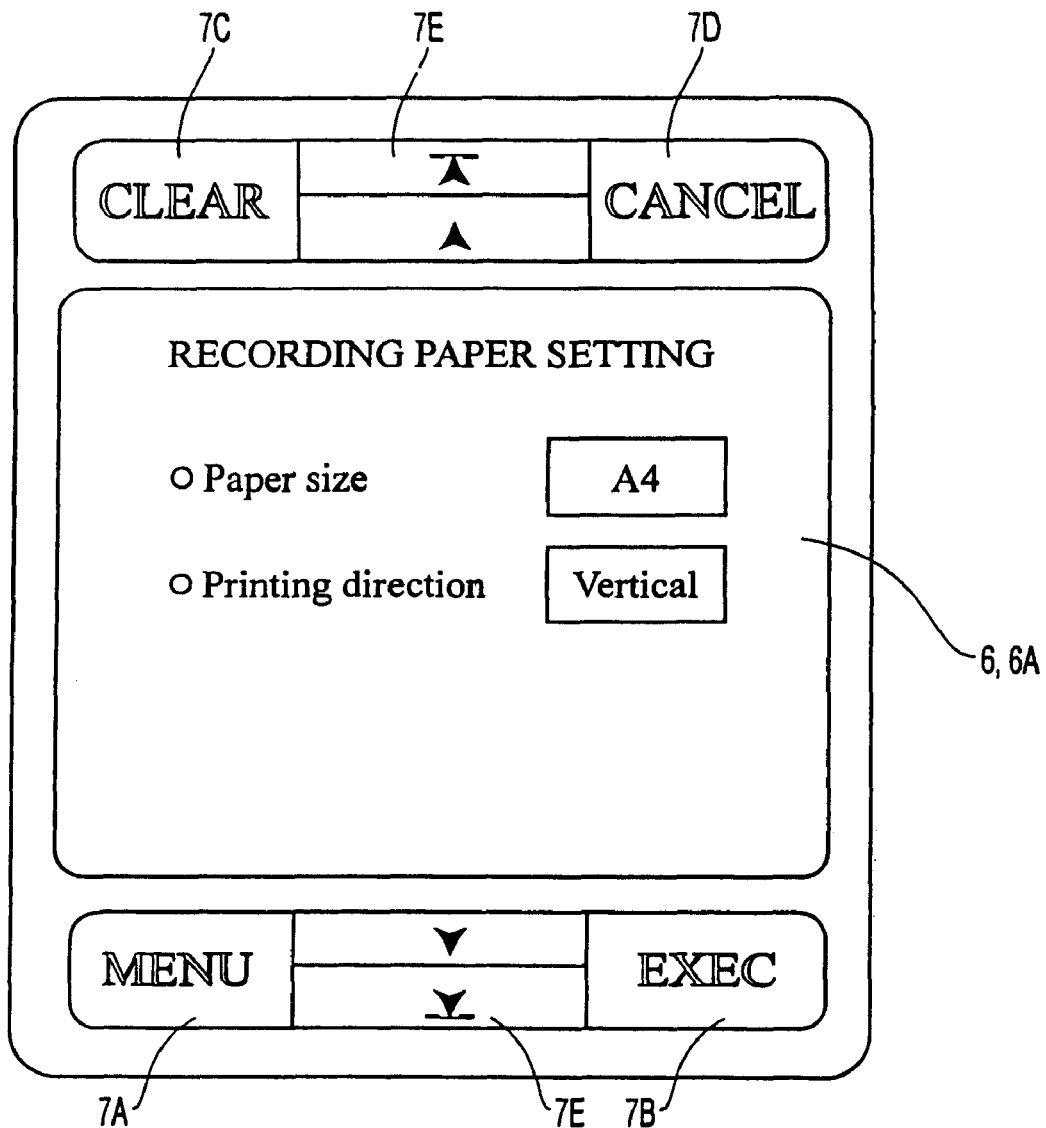
FIG. 14 is another display example of a screen displayed on the LCD 6 when the processing of FIG. 12 is executed.

In step S2, the CPU 39 displays the setting screen which is shown in FIG. 14 on the LCD 6 and receives the setting of the recording paper.

In this display example, the selection items "paper size" and "printing direction" are displayed underneath the title "recording paper setting". To the right of each setting item, a window is arranged in which the setting content is displayed. The setting content which is displayed in this window can be set by the user to select a desired item among the selection items that are listed on a pull-down menu (not shown in the figure) which is displayed by pressing the window with a pen 41. In this example, "A4" is selected as the paper size, and "vertical" is selected as the paper direction. The content which is thus set is stored in the setting information recording area of the memory card 24.

When the processing of step S2 is completed, the CPU 39 completes the print mode setting processing (END).

According to the above processing, the setting of the printing mode of the printer 100 can be performed.

Next, printing processing is explained which performs printing according to the content which is set by the above processing.

Figure 15A:
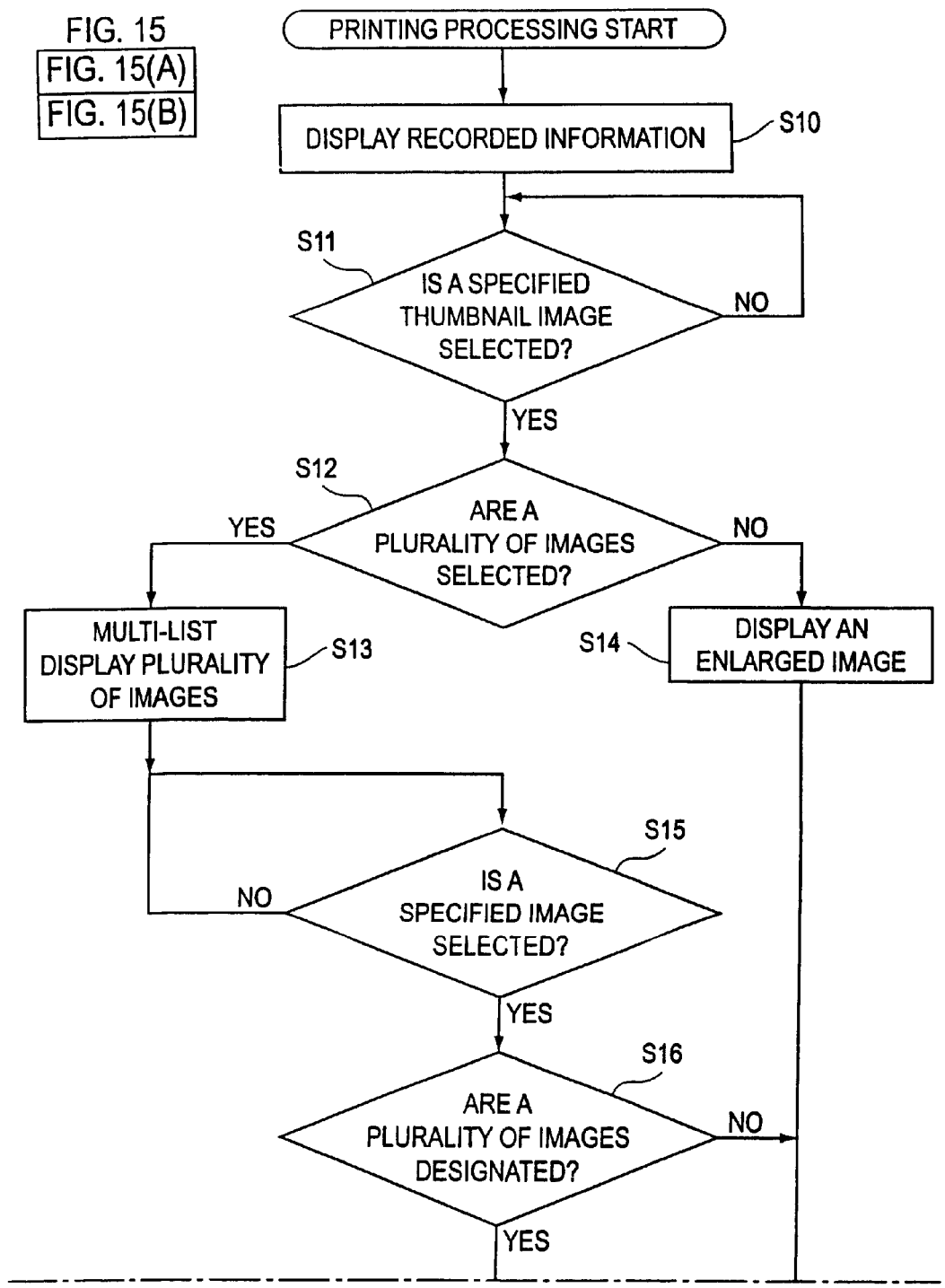
FIG. 15 is a flow chart explaining one example of the printing processing.
Figure 15B:
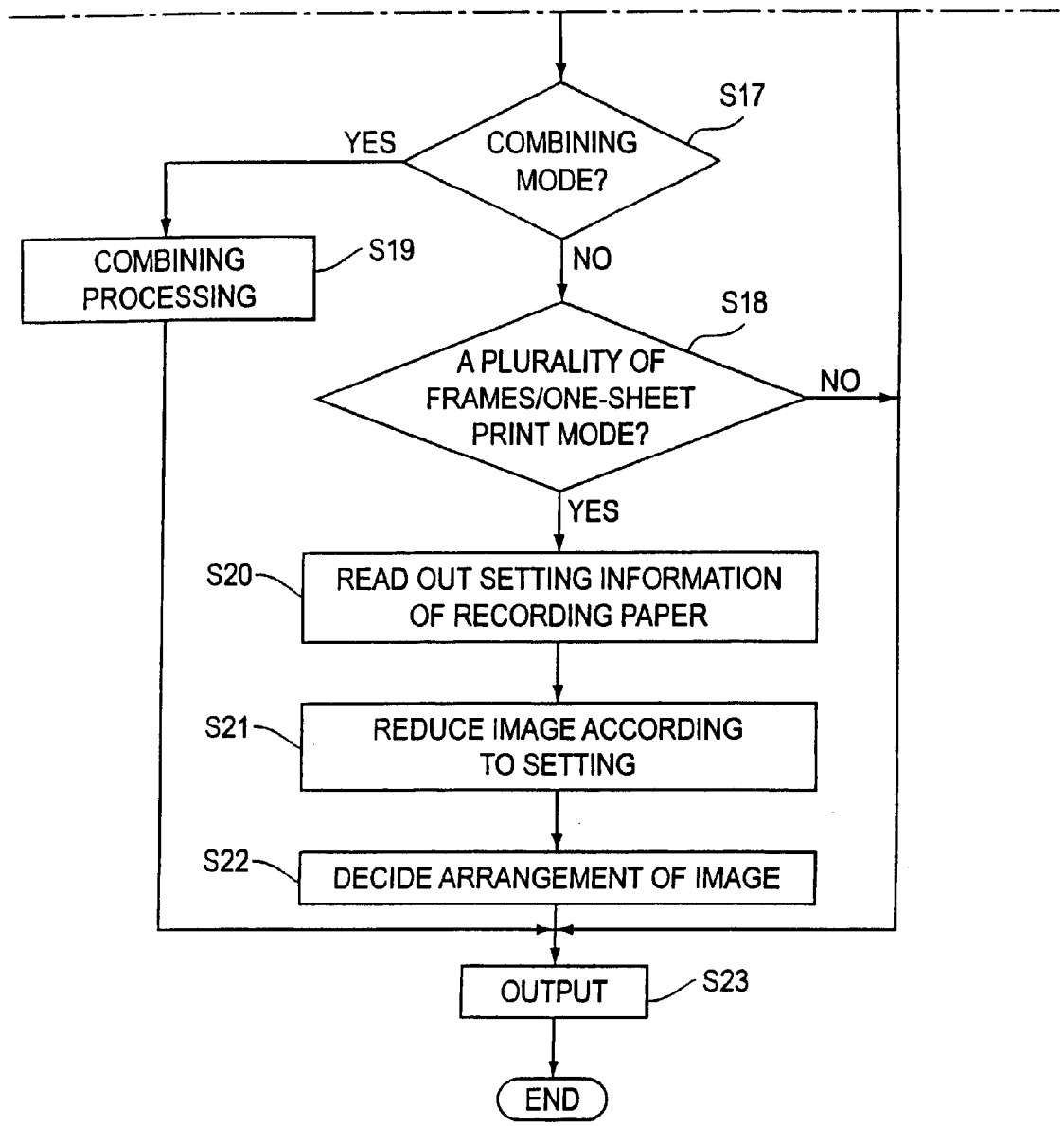

FIG. 15 is a flow chart which explains one example of printing processing. This processing is executed when the selection item "printing" is selected on a menu screen (not shown in the figure) which is displayed when the menu key 7A is pressed.

When this processing is executed, in step S10, the CPU 39 displays recorded information such as a shot image which is recorded in the memory card 24, for example, on the LCD 6 as shown in FIG. 9. Then, the program proceeds to step S11.

In step S11, after the thumbnail image which is the subject of printing is selected, the CPU 39 evaluates whether the execution key 7B is pressed. As a result, when it is evaluated that a thumbnail image is not selected, or that the execution key 7B is not pressed (NO), the program returns to step S11 and repeats the same processing as mentioned above. When it is evaluated that the execution key 7B is pressed (YES) after a thumbnail image is selected, the program proceeds to step S12.

In step S12, the CPU 39 evaluates whether there is more than one selected thumbnail image in step S11. As a result, when it is evaluated that only one thumbnail image is selected (NO), the program proceeds to step S14. In step S14, the CPU 39 reads out the shot image which corresponds to the selected thumbnail image from the memory card 24, and displays it on the LCD 6 after performing decompression processing. Then, the program proceeds to step S23.

Figure 16:
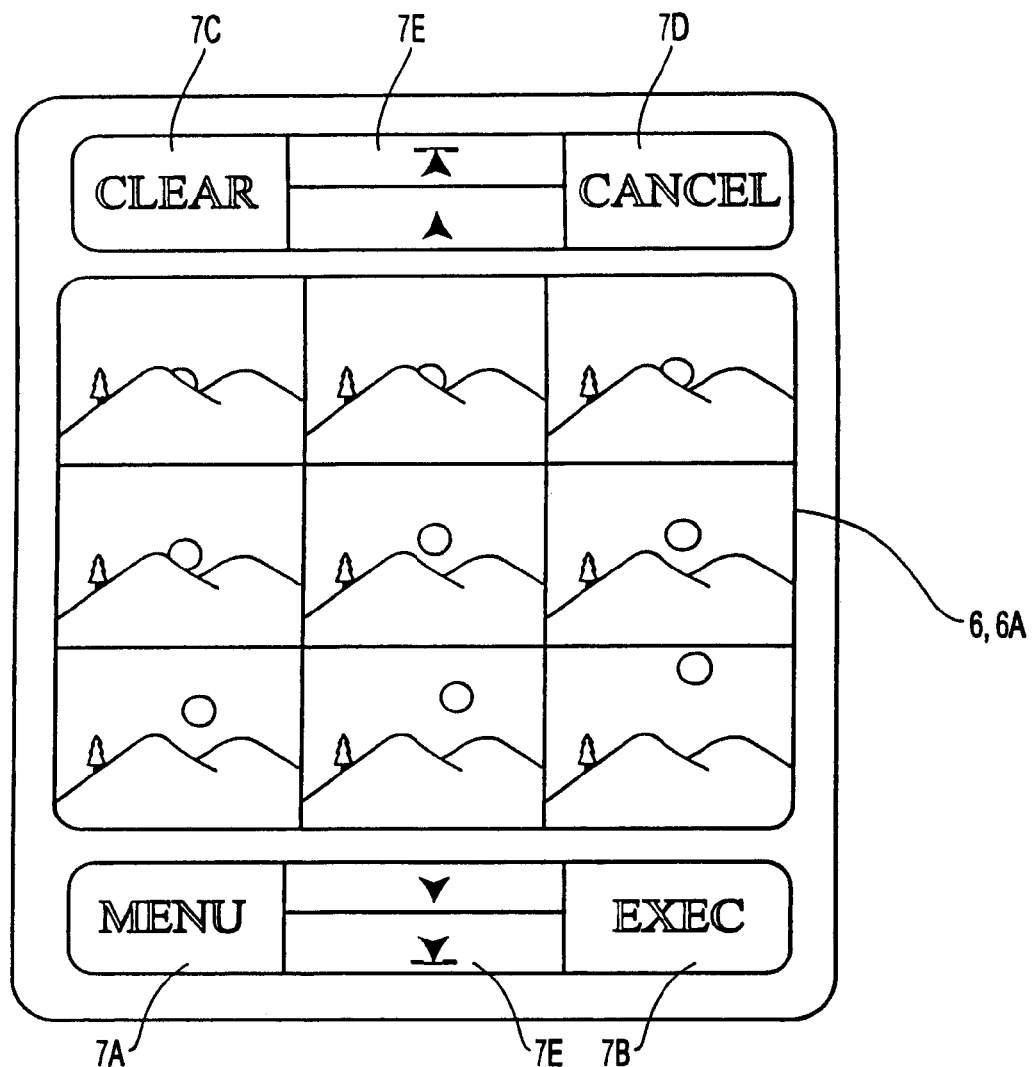
FIG. 16 is a display example of a screen displayed on the LCD 6 when the processing shown in FIG. 15 is executed.

When it is evaluated in step S12 that a plurality of thumbnail images are selected (YES), the program proceeds to step S13. In step S13, the CPU 39 reads out the shot images which correspond to the selected thumbnail images from the memory card 24, performs decompression processing, and then reduces each image (for example, thins out pixels) according to the number of images, and multi-list displays the obtained images as shown in FIG. 16. In the display example which is shown in FIG. 16, images which were continuously shot (images of a sunrise that was shot) are displayed such that the screen is divided into 9 parts. Then, the program proceeds to step S15.

In the display example which is shown in FIG. 16, since 9 images are selected, it is possible to display the images on an equally divided screen. However, for example, when 7 images are selected, it is acceptable to display 4×2 frames including one empty space, or to display 3×3 frames including two empty spaces.

In step S15, after the specified image or images is/are selected from among the images that are multi-list displayed on the LCD 6 in step S13, it is evaluated whether the execution key 7B is pressed. In other words, the CPU 39 evaluates whether a specified image or images is/are selected from among the images that are displayed on LCD 6 with reference to the output from the touch tablet 6A, and also evaluates whether the execution key 7B is pressed. As a result, when it is evaluated that a specified image or images is/are not selected, or that the execution key 7B is not pressed (NO), the program returns to step S15, and the same processing as mentioned above is repeated. After a specified image or images is/are selected, when it is evaluated that the execution key 7B is pressed (YES), the program proceeds to step S16.

In step S16, the CPU 39 evaluates whether more than one image was designated in step S15. As a result, when it is evaluated that one image was designated in step S15 (NO), the selected image is stored in a specified area of the memory card 24 (printing waiting image storing area) and the program proceeds to step S23. When it is evaluated that a plurality of images were selected (YES), the program proceeds to step S17.

In step S17, it is evaluated whether "plurality of frames combined/one sheet print mode" (hereafter combining mode) is selected at the setting screen which is shown in FIG. 13. In other words, the CPU 39 reads out the setting information from the setting information recording area of the memory card 24, and evaluates whether the combining mode is selected. As a result, when it is evaluated that the combining mode is selected (YES), the program proceeds to the processing of step S19. When it is evaluated that the combining mode is not selected (NO), the program proceeds to the processing of step S18.

In step S18, it is evaluated whether "plurality of frames/one sheet print mode" is selected at the setting screen of FIG. 13. In other words, the CPU 39 reads out the setting information from the setting information recording area of the memory card 24, and evaluates whether the plurality of frames/one sheet print mode is set. As a result, when it is evaluated that the plurality of frames/one sheet print mode is not set, the selected plurality of images are stored to the printing waiting image storing area of the memory card 24 separately one by one, and the program proceeds to the processing of step S23. When it is evaluated that the plurality of frames/one sheet print mode is set (YES), the program proceeds to step S20.

In step S20, the content which is set at the setting screen of FIG. 14 is read out. In other words, the CPU 39 reads out the setting information from the setting information recording area of the memory card 24, and obtains the setting content of the recording paper. Then, the program proceeds to step S21.

In step S21, reducing processing (for example, thinning-out processing of pixels) corresponding to the setting content of the recording paper which was obtained at step S20, is performed to each image that was selected in step S15.

In step S22, the CPU 39 refers to the number of selected images, the size of recording paper, and the printing direction of the recording paper, and decides the arrangement of the images to which the reducing processing has been performed. Then, according to the decided arrangement, the reduced images are combined, and the obtained image is stored as one image in the printing waiting image storing area of the memory card 24.

Incidentally, in order to execute the processing of steps S21 and S22, it is acceptable to prepare a table (see FIG. 17) that shows the relationship of the arrangement to setting content of the recording paper, the number of selected images, and the size of the image which is going to be printed, and to appropriately compress each image and decide its arrangement in accordance with this table.

The table shown in FIG. 17 corresponds to the case of printing on A4 size recording paper in the vertical orientation. In this example, the sizes of one image and the conditions of the arrangement of the image when printing 2-9 images are shown. For example, when two images are printed, images of 30 mm×190 mm are arranged so that the recording paper is divided vertically in two.

Additionally, in the table shown in FIG. 17, vertical-to-horizontal ratio of the image is ignored, and the vertical and horizontal length is decided such that the recording area of the recording paper of A4 size is fully used, and the images are compressed. However, depending on the image, it may be desirable to fix the vertical and horizontal ratio of the image and reduce it. This can be done by fixing the vertical-to-horizontal ratio so that it fits into one of the image sizes which are shown in the table, and then reducing it.

Additionally, the content of this kind of table can be appropriately changed by the user.

Returning to FIG. 15, in the processing of step S17, when it is evaluated that the combining mode is selected (YES), the program proceeds to step S19. In step S19, the combining processing of the images is executed. In other words, processing is performed to superimpose the selected plurality of images, then they are combined into one image (the details are later mentioned). Then, the program proceeds to step S23.

In step S23, the CPU 39 reads out the image which is stored in the printing waiting image storage area of the memory card 24, and outputs it to the printer 100 via the interface 48. When a plurality of images exist in the printing waiting image storing area, these images are output to the printer 100 in specified order.

As a result, the CPU 102 of printer 100 receives the image data which is output from the electronic camera 1 via the IF 106, temporarily stores it in the RAM 104, then supplies the image data to the printing part 107 and prints it on recording paper.

Figure 18:
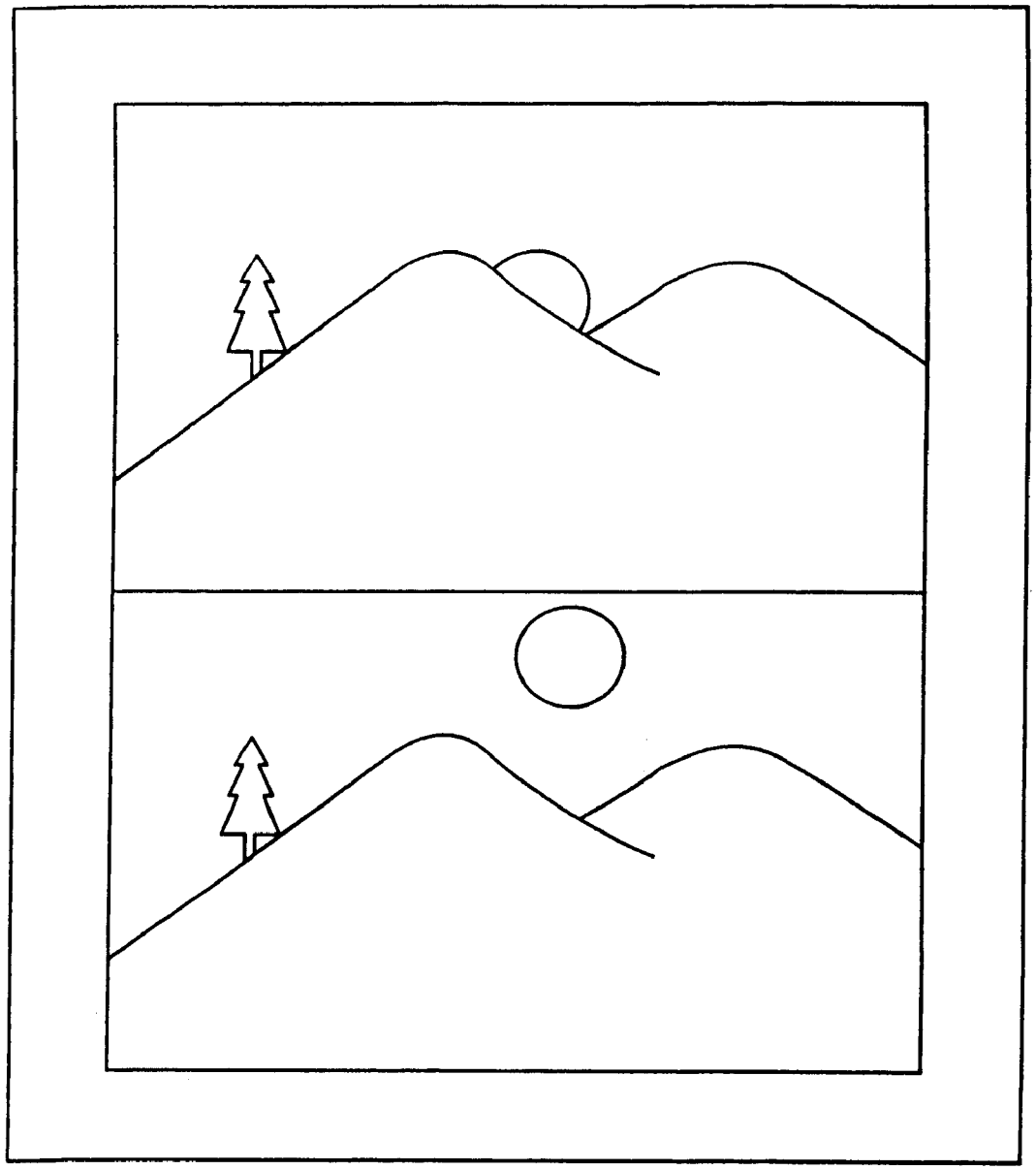
FIG. 18 is one example of an image to be printed as a result of the processing shown in FIG. 15.

Now, if there are two images that were selected in step S15 (for example, the images at the upper left and bottom center of FIG. 16 are selected), and if the plurality of frames/one sheet print mode is selected, as shown in FIG. 18, two images are displayed such that the top and bottom of A4 recording paper is divided in two.

Figure 19:
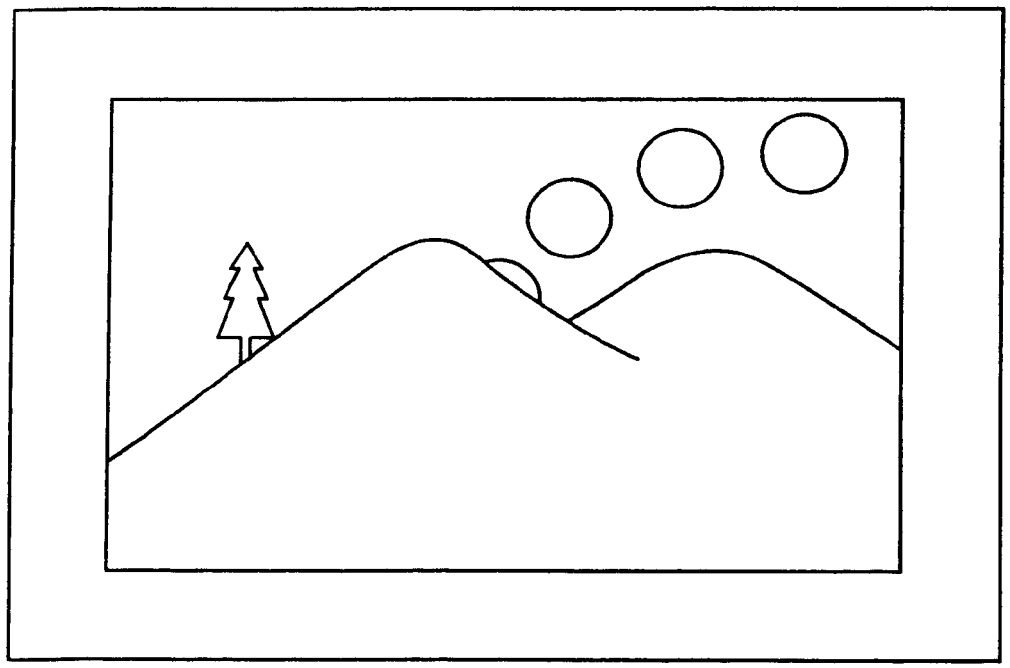
FIG. 19 is another example of an image to be printed as a result of the processing shown in FIG. 15.

Additionally, if the four images at the upper left, second level center, bottom center, and bottom right of FIG. 16 are selected in step S15, and if the combining mode is selected, the selected four images are superimposed and printed as one image as shown in FIG. 19.

Figure 20:
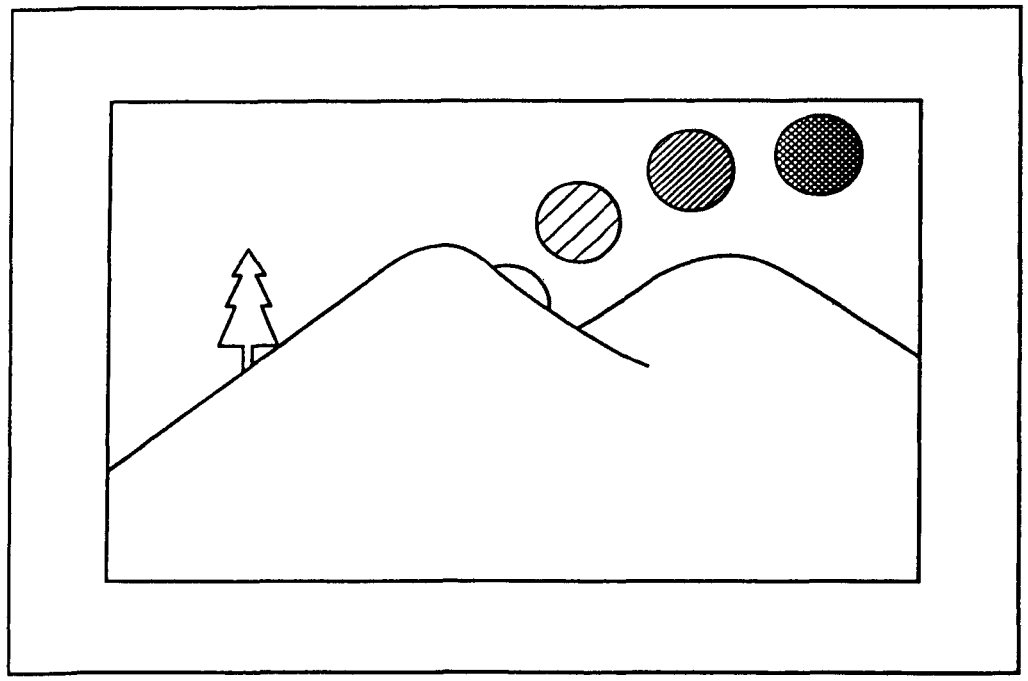
FIG. 20 is another example of an image to be printed as a result of the processing shown in FIG. 15.

When the processing of step S23 is completed, the CPU 39 completes the printer processing (END). When the selected images are superimposed and printed as one image, it is also acceptable, as shown in FIG. 20, to print so that the changing part in each image can be noticed at a glance by gradually changing the print density of the changing portion (the moon in FIG. 20) of each selected image.

Figure 21:
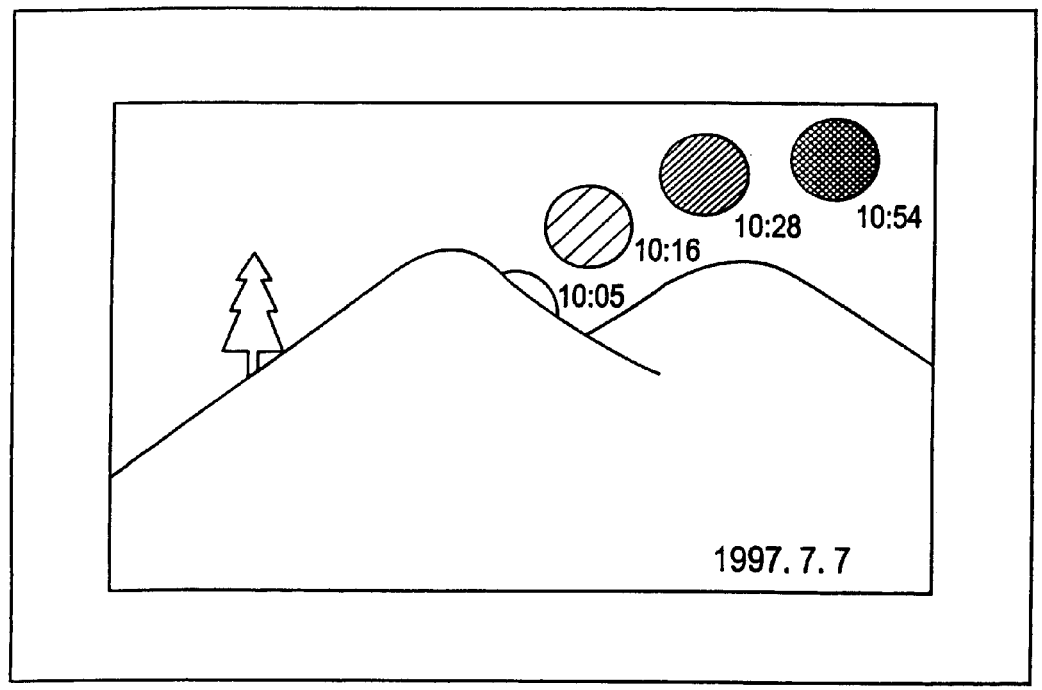
FIG. 21 is another example of an image to be printed as a result of the processing shown in FIG. 15.

Additionally, as shown in FIG. 21, the shooting time of the changing portion in each image can be conveniently known by simultaneously printing the shooting time or the like near the characteristic portion of each selected image.

According to the above-mentioned embodiment, when printing a plurality of images on one recording paper, since the size and arrangement of the images are automatically decided according to the size of the recording paper, the printing direction and the number of images that are going to be printed, it is possible to improve the flexibility of printing.

Additionally, the control program which is shown in FIGS. 12 and 15 is stored in the memory card 24. This program can be provided to the user in the condition of being prestored in memory card 24, or can be provided to the user in the condition of being stored on a CD ROM (compact disk ROM) so that it can be copied to the memory card 24.

What is claimed is:

1. An electronic camera that records and replays an optical image of an object, the electronic camera comprising:
a converter that converts an optical image of the object into image data; a recorder that records the image data obtained by the converter; a reader that reads out desired image data that is recorded by the recorder;
a display that displays at least the image data;
a print mode selector that causes a print mode setting menu to be displayed on the display by which a user selects any one of a first print mode in which a plurality of image data is printed on a sheet of recording paper;

a second print mode in which the plurality of image data is superimposed on the sheet of recording paper, and a third print mode in which one image data is printed on the sheet of recording paper;

a paper size selector that causes a recording paper setting menu to be displayed on the display by which a user selects at least a paper size;

an image selector that selects, as a print subject, a reduced version of the recorded image data displayed on the display;

a layout adjustor that:
  (1) displays the plurality of image data in a multi-list on the display when the plurality of image data is selected by the image selector,
  (2) references setting information for setting an external printer and information of the paper size and automatically enlarges or reduces each of the plurality of image data to layout on the sheet of recording paper when the plurality of image data is selected by the image selector and the first print mode is selected by the print mode selector,
  (3) superimposes the plurality of image data to layout on the sheet of recording paper when the plurality of image data is selected by the image selector and the second print mode is selected by the print mode selector, and
  (4) enlarges and displays the image data on the display to layout the image data on the sheet of recording paper if the third print mode is selected; and an output device that outputs to the printer the plurality of image data or the one image data laid out by the layout adjuster, wherein the camera is a hand-held camera.

2. The electronic camera of claim 1, wherein the output device includes an interface that transfers the image data to the external printer.

3. The electronic camera of claim 2, wherein the interface transmits the image data directly from the electronic camera to the external printer.

* * * * *